United States Patent
Muellner

(10) Patent No.: US 9,762,282 B1
(45) Date of Patent: Sep. 12, 2017

(54) INTEGRATED CIRCUITS AND TRANSPONDER CIRCUITRY WITH IMPROVED ASK DEMODULATION

(71) Applicant: Texas Instruments Deutschland GmbH, Freising (DE)

(72) Inventor: Ernst Georg Muellner, Munich (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 0 days.

(21) Appl. No.: 15/459,738

(22) Filed: Mar. 15, 2017

(51) Int. Cl.
  *H04B 1/40* (2015.01)
  *H04L 27/06* (2006.01)
  *H02M 3/155* (2006.01)

(52) U.S. Cl.
  CPC .............. *H04B 1/40* (2013.01); *H02M 3/155* (2013.01); *H04L 27/06* (2013.01)

(58) Field of Classification Search
  CPC ........... H04B 1/40; H04L 27/06; H02M 3/155
  See application file for complete search history.

(56) References Cited

U.S. PATENT DOCUMENTS

| | | |
|---|---|---|
| 2009/0174592 A1 | 7/2009 | Muellner |
| 2009/0189688 A1* | 7/2009 | Nehrig ............... G06K 19/0723 329/311 |
| 2010/0141389 A1 | 6/2010 | Hagl et al. |
| 2010/0253315 A1* | 10/2010 | Nehrig ................... H02J 17/00 323/315 |
| 2012/0092055 A1 | 4/2012 | Peschke et al. |
| 2012/0161942 A1 | 6/2012 | Muellner et al. |
| 2013/0009706 A1 | 1/2013 | Peschke et al. |
| 2015/0145651 A1 | 5/2015 | Muellner et al. |
| 2016/0328637 A1 | 11/2016 | Viikari |

OTHER PUBLICATIONS

U.S. Appl. No. 15/459,696, entitled Integrated Circuits and Transponder Circuitry with Shared Modulation Capacitor for 3D Transponder Uplink Modulation, filed Mar. 15, 2017 (34 pages).

* cited by examiner

*Primary Examiner* — Jaison Joseph
(74) *Attorney, Agent, or Firm* — John R. Pressetto; Charles A. Brill; Frank D. Cimino

(57) ABSTRACT

Disclosed examples include an RF transponder circuit with signal input nodes, a rectifier circuit with a power transistor and a current mirror circuit to generate a rectifier mirror current signal, a limiter circuit with a limiter transistor and a current mirror circuit to generate a limiter mirror current signal, and a demodulator circuit to demodulate an amplitude shift keying (ASK) RF signal received at the signal input nodes according to the rectifier and limiter mirror current signal to generate a binary demodulator data signal representing the presence or absence of a threshold amount of energy in the RF signal.

20 Claims, 11 Drawing Sheets

INTEGRATED CIRCUITS AND TRANSPONDER CIRCUITRY WITH IMPROVED ASK DEMODULATION

REFERENCE TO RELATED APPLICATION

This application relates to co-owned and co-assigned U.S. patent application Ser. No. 15/459,696 filed contemporaneously with the present application, entitled "INTEGRATED CIRCUITS AND TRANSPONDER CIRCUITRY WITH SHARED MODULATION CAPACITOR FOR 3D TRANSPONDER UPLINK MODULATION", naming Ernst Georg Muellner as inventor, which is hereby incorporated by reference in its entirety herein.

BACKGROUND

The present disclosure relates generally to radio receivers and transmitters, and more particularly to multichannel radio frequency identification (RFID) transponders and systems. RFID transponders are typically small devices that may include a battery to power internal circuitry, but often operate using energy that can be harvested from an RF field generated by an RFID reader. Low-power transponders often begin operation with zero internal power and generate internal supply power using energy received through a transponder antenna. In operation, the transponder receives a specific RF signal from a reader, and responds by transmitting an RF signal with specific characteristics that can be detected by the reader. The RF signals generated by the reader and transponder are typically modulated with data, allowing data exchange between the reader and the transponder. This feature of low-power RF transponders is useful in a variety of applications, such as automotive devices. RF transponders include an antenna to receive signals and/or energy from a reader, as well as to transmit data to the reader. The data and power reception is typically dependent upon the relative orientation of the reader antenna and the transponder antenna.

Multichannel (e.g., 3-D) transponders are useful where the relative positioning of the reader and the transponder is variable. For example, automotive immobilizer systems include an RFID reader positioned in a fixed location in a vehicle, and a 3-D transponder is mounted to a key fob. A user may be allowed entry to a vehicle and/or permitted to press a start button to start the vehicle if the vehicle's RFID reader properly detects the key fob transponder. However, the relative position of the fixed RFID reader antenna and the key fob-mounted transponder antennas is indeterminate. Accordingly, such immobilizer systems often use 3-D transponder antenna arrangements where a set of three antennas are mounted at mutually orthogonal orientations on the fob. The initial transmission of data from the reader to the transponder is referred to as downlink communications. Once a transponder receives data from the reader, the transponder replies with transmitted information referred to as uplink communications.

The downlink communications is typically accomplished by a reader device modulating the amplitude of a carrier signal for different data states. For example, the reader can transmit an RF signal at or above a predefined minimum amplitude at a given carrier frequency to represent a first data state (e.g., "1"), and transmit no signal or a signal less than the predefined minimum amplitude at the carrier frequency to represent a second binary state (e.g., "0"). Other possible ASK modulation schemes can be used, for example, to provide three or more discernible data states based on different detectable signal amplitudes. In many applications, a transponder must demodulate an ASK signal with a very wide dynamic range for the input signal at a low power dissipation, particularly where the transponder harvests energy from the received RF signal. One possible approach is to use envelope detection circuitry form demodulation, such as a rectifier and a low-pass filter to provide a signal for threshold comparison. However the envelope can vary significantly for different field strengths and antenna conditions, and the resulting ASK demodulation is often unreliable. Similar envelope detection can be used to select a particular one of multiple (e.g., three) transponder antennas for use in uplink communications.

SUMMARY

Disclosed examples include a single or multichannel RF transponder circuit with signal input nodes, a rectifier circuit with a power transistor and a current mirror circuit to generate a rectifier mirror current signal, and a limiter circuit with a limiter transistor and a current mirror circuit to generate a limiter mirror current signal. The transponder includes a demodulator circuit to demodulate an ASK modulated RF signal received at the signal input nodes according to the rectifier and limiter mirror current signal to generate a binary demodulator data signal representing the presence or absence of a threshold amount of energy in the RF signal. In certain examples, the transponder circuit includes channel selection circuitry to choose a particular one of multiple transponder circuits with a highest signal level for use in uplink communications based on the mirror current signals from the rectifier and limiter.

DETAILED DESCRIPTION

Figure 1:
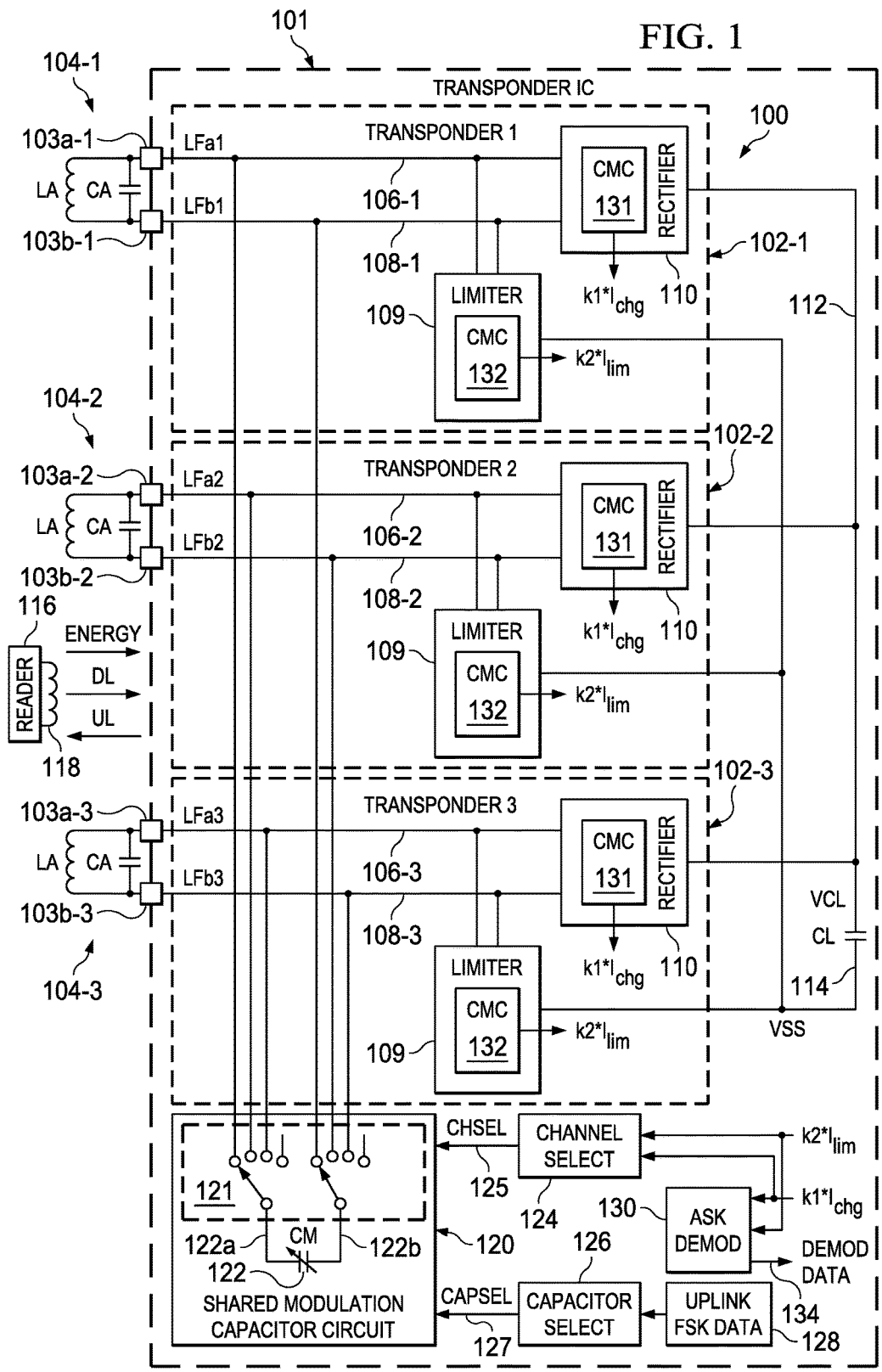
FIG. 1 is a schematic diagram of a multichannel RFID system with a 3-D transponder.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " In addition, the terms "couple", "coupled" or "couples" are intended to include indirect or direct electrical or mechanical connection or combinations thereof. For example, if a first device couples to or is coupled with a second device, that connection may be through a direct electrical connection, or through an indirect electrical connection via one or more intervening devices and connections.

Figure 2:
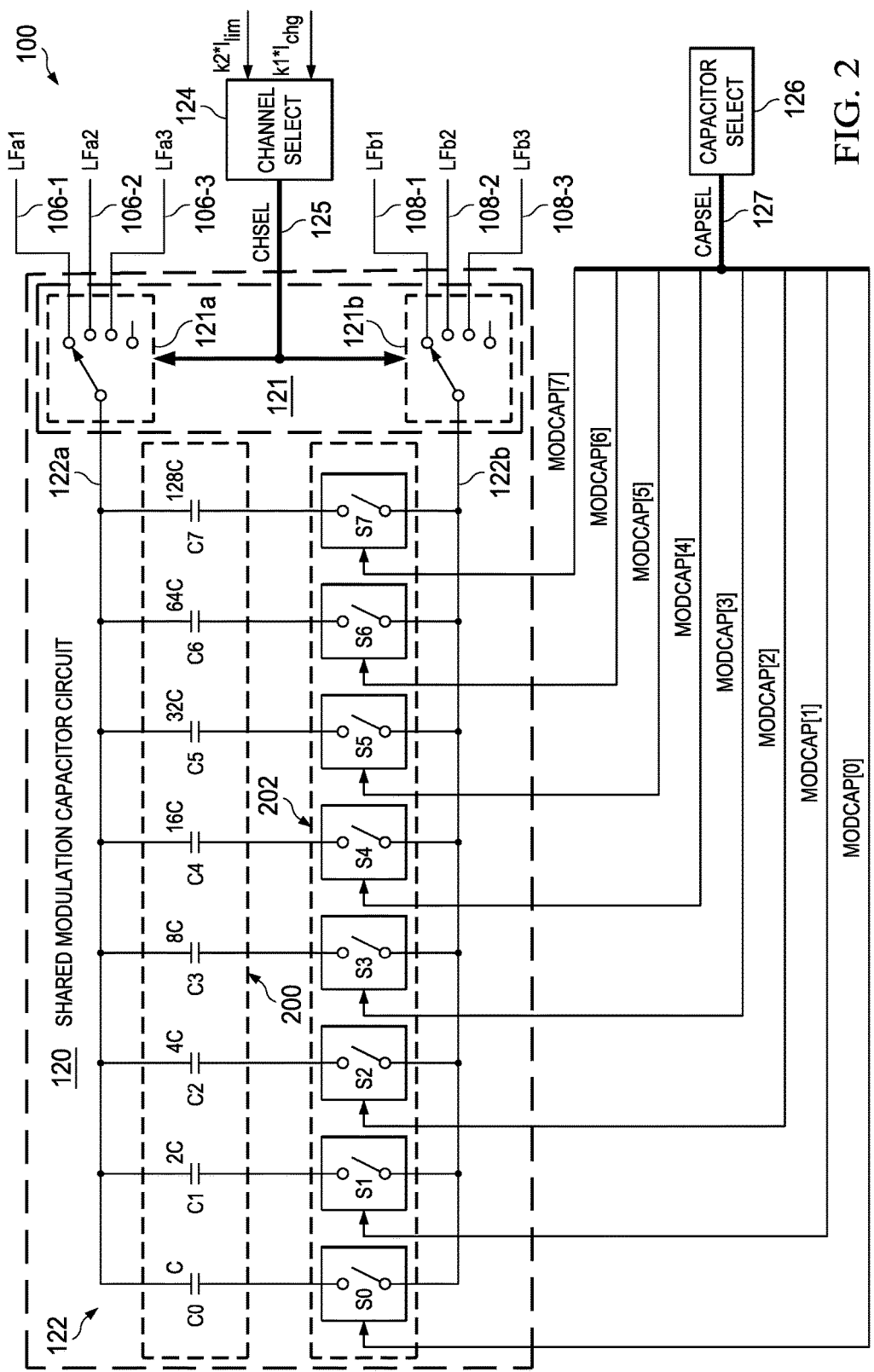
FIG. 2 is a schematic diagram of an example shared modulation capacitor circuit in the transponder of FIG. 1.

Referring initially to FIGS. 1 and 2, transponder circuits 100, integrated circuits 101 and multichannel transponder systems are disclosed in which current mirror circuits are used to obtain signals from rectifier and limiter circuitry for ASK the modulation. Disclosed examples use information from otherwise required circuit box for rectification and limitation in order to provide simple low-cost demodulation solutions to mitigate or avoid the shortcomings associated with conventional envelope detection using rectifier, low-pass filter and comparator circuits. In certain examples, moreover, the current mirror signals are also used to compare the field strengths of the receive signals at multiple transponder channel. The result of this comparison can be used to select a particular multichannel transponder channel circuit for use in uplink FSK communications to respond to downlink data from a reader device.

FIG. 1 illustrates a multichannel RFID system with a transponder circuit 100 formed in a 3-D transponder integrated circuit (IC) 101. FIG. 2 illustrates details of an example shared modulation capacitor circuit in the transponder IC 101 of FIG. 1. The transponder circuit 101 includes multiple transponder channel circuits 102 that are individually connected to a corresponding antenna circuit 104 to receive a radio frequency (RF) signal LFa, LFb. In the illustrated example, the transponder IC 101 includes three transponder circuits 102-1 (TRANSPONDER 1 in the drawing), 102-2 (TRANSPONDER 2) and 102-3 (TRANSPONDER 3). In other examples, any integer number M transponder circuits 102 can be used, where M is greater than 1. In FIG. 1, the transponder channel circuits 102-1, 102-2 and 102-3 are individually associated with a corresponding transponder antenna circuit 104-1, 104-2 and 104-3, respectively. The individual transponder antenna circuits 104 include an antenna with an inductance LA, and an antenna circuit capacitor CA. In one example, the transponder system of FIG. 1 can be used in an automotive vehicle immobilizer system in which the individual antennas are positioned in a key fob or user key device at different orientations from one another. For example, three mutually orthogonal antennas can be used in order to facilitate RF communications between the transponder system and an antenna 118 of a reader 116. As schematically shown in FIG. 1, the reader 116 transmits downlink data DL to the transponder system, for reception by one or more of the transponder antenna circuits 104. In operation, the transponder system responds by transmitting uplink data UL from a selected one of the transponder antenna circuits 104 to the reader antenna 118.

The individual transponder channel circuits 102-1, 102-2 and 102-3 including a signal input node pair including a first signal input node 106 and a second signal input node 108. The individual signal input node pairs 106, 108 are coupled to receive an RF signal LFa, LFb from the associated transponder antenna circuit 104. In the illustrated example, the IC 101 includes three externally accessible terminal pairs 103, for example, conductive IC pins or pads. The terminal pairs 103 are individually connected to a corresponding signal input node pair 106, 108 to receive a corresponding RF signal LFa, LFb from the associated transponder antenna circuit 104. In this example, the first terminal pair includes a terminal 103a-1 connected to deliver a signal LFa1 to a signal input node 106-1 of the first transponder channel circuit 102-1, as well as a terminal 103b-1 connected to deliver a signal LFb1 to a signal input node 108-1 of the first transponder channel circuit 102-1. Similarly, a second terminal pair includes a terminal 103a-2 connected to deliver a signal LFa2 to a signal input node 106-2, and a terminal 103b-2 connected to deliver a signal LFb2 to a signal input node 108-2 of the second transponder channel circuit 102-2. In addition, a third terminal pair associated with the third transponder circuit 102-3 includes a terminal 103a-3 connected to deliver a signal LFa3 to a signal input node 106-3, and a terminal 103b-3 connected to deliver a signal LFb3 to a signal input node 108-3.

As shown in FIG. 1, the individual transponder channel circuits 102 include a channel rectifier circuit 110 connected to the corresponding signal input nodes 106 and 108, as well as a channel limiter circuit 109 also connected to the signal input nodes 106 and 108. Further details of an example limiter circuits are illustrated and described below in connection with FIGS. 5, 7 and 8. The individual transponder channel rectifier circuits 110 in certain examples are cross-coupled full bridge rectifier circuits. Example channel rectifier circuits 110 are further illustrated and described below in connection with FIGS. 5 and 6. The transponder channel rectifier circuits 110 generate a supply voltage VCL at a supply node 112 relative to a voltage VSS of a reference node 114 from a received RF signal LFa, LFb. The transponder IC 101 further includes a load capacitor CL connected between the supply voltage node 112 and the reference node 114. As discussed further below, the use of a full bridge rectifier circuit or circuits 110 advantageously facilitates control of the antenna voltages between the supply voltage VCL and the reference node voltage VSS (e.g., ground). This, in turn, facilitates switched sharing of a single modulation capacitor 120 for uplink communications using FSK. In operation, various circuitry of the transponder IC 101 is powered by the supply voltage VCL, and the rectifier circuits 110 establish or maintain the supply voltage VCL using energy derived from received RF signals at one or more of the antenna circuits 104. In this manner, the illustrated reader 116 in FIG. 1 delivers energy (schematically shown as ENERGY in FIG. 1) to power the transponder IC 101. In certain examples, the IC 101 is exclusively powered by received energy from an associated reader circuit 116. In other examples, the IC 101 can be powered by an associated battery to at least partially establish the supply voltage VCL (not shown), and the rectifier circuits 110 can be used to supplement battery-powered, or to power the IC 101 when the battery is discharged.

In operation, the presence of a field associated with the RF signal LFa, LFb at one or more of the antenna circuits 104 causes two different modes of operation of the limiter circuit 109 and the rectifier circuit 110 of the associated transponder channel circuit or circuits 102. If the supply voltage VCL is not at the maximum, then the supply capacitor CL is charged by the received signal LFa, LFb by conducting current through a transistor of the rectifier circuit 110. If, however the supply voltage VCL has reached the maximum, the limiter circuit 109 operates to limit the field by conducting current through a transistor of the limiter circuit 109. In both these cases, the presence of the received signal corresponds to current flow through one or more transistors of either the limiter circuit 109 or the rectifier circuit 110. Where no field strength is present at the antenna circuit 104, no current flows in these transistors of the circuits 109 or 110. The transponder circuit 100 includes current mirror circuitry (CMC) 131 in the rectifier circuits 110, as well as current mirror circuitry 132 in the limiter circuits 109 to respectively generate rectifier and limiter mirror current signals $k1*I_{chg}$ and $k2*I_{lim}$ as shown in FIG. 1. In this manner, the transponder circuit 100 generates current signals that are proportional to the field strength. The mirror current signals, moreover, follow the received RF field created by the received signal with little delay. The circuit 100 in FIG. 1 further includes ASK demodulator circuitry 130 that compares the mirror current signals $k1*I_{chg}$ and $k2*I_{lim}$ with one or more reference current signals. In certain examples, described below in connection with FIGS. 16 and 17, the demodulator circuit 130 includes comparators or Schmitt trigger circuits and logic circuitry to generate a demodulated data signal DEMOD DATA at a demodulator output 134 based on the mirror current signals $k1*I_{chg}$ and $k2*I_{lim}$. The DEMOD DATA signal represents the presence or absence of a threshold amount of energy in the RF signal LFa, LFb received at the signal input node pair(s) 106, 108 based on the rectifier mirror current signal(s) $k1*I_{chg}$ and the limiter mirror current signal(s) $k2*I_{lim}$.

As further shown in FIG. 1, the rectifier and limiter mirror current signals $k1*I_{chg}$ and $k2*I_{lim}$, are provided to a channel select circuit 124 to detect the antenna circuit 104 with the strongest signal by comparing the mirrored current signals from different transponder channel circuits 102 as detailed further below in connection with FIGS. 18 and 19. The channel select circuit 124 generates a channel select signal CHSEL indicating a particular one of the transponder channel circuits 102 having a highest received field strength based on the rectifier mirror current signals $k1*I_{chg}$ and the limiter mirror current signals $k2*I_{lim}$ from the individual transponder channel circuits 102. The transponder circuit 100 also includes a modulation capacitor 122 with first and second capacitor nodes 122a, and 122b, as well as a channel switching circuit 121, which selectively connects the capacitor nodes 122a, 122b to the selected transponder channel circuit 102 according to the channel select signal CHSEL.

As best shown in FIG. 1, the transponder IC 101 and the transponder circuit 100 thereof also include a modulation circuit with a configurable shared modulation capacitor 122 with a capacitance value CM, and a channel switching circuit 121 to selectively connect the modulation capacitor 122 to a selected transponder channel circuit 102. In addition, the transponder circuit 100 includes a modulation circuit 120, 126 to selectively change a capacitance value CM of the modulation capacitor 122 according to a modulation control signal CAPSEL, for example to transmit uplink data 128 using the selected transponder channel circuit 102 using frequency shift keying (FSK) communications. In operation, once the transponder circuit 100 receives downlink data DL from the reader 116, the transponder circuit 100 replies with uplink data 128, and transmits the uplink data UL to the reader 116 using a selected one of the transponder circuits 102. For FSK uplink communication, the transponder circuit 100 selectively changes the capacitance value CM of the shared modulation capacitor 122 to modify the RF signal frequency using the resonant antenna circuit including the modulation capacitance CM, the selected antenna circuit antenna inductance LA and the antenna circuit capacitor CA. As deviously discussed, replicating switched capacitors for FSK signal modulation in each of the transponder channel circuits 102 requires significant semiconductor die or chip area, particularly for a 3-D transponder with three antenna circuits 104. In typical 3-D transponder applications (e.g., automotive immobilizer systems), only one antenna circuit 100 for transmits uplink data back to the reader 116. In the illustrated examples, a single shared modulation capacitor circuit 120 provides selective connection to a single one of the transponder channel circuits 1024 FSK uplink modulated communications. Disclosed examples thus provide significant advantages with respect to conserving semiconductor die area by sharing the capacitor 122 between the three transponder channels.

Figure 3:
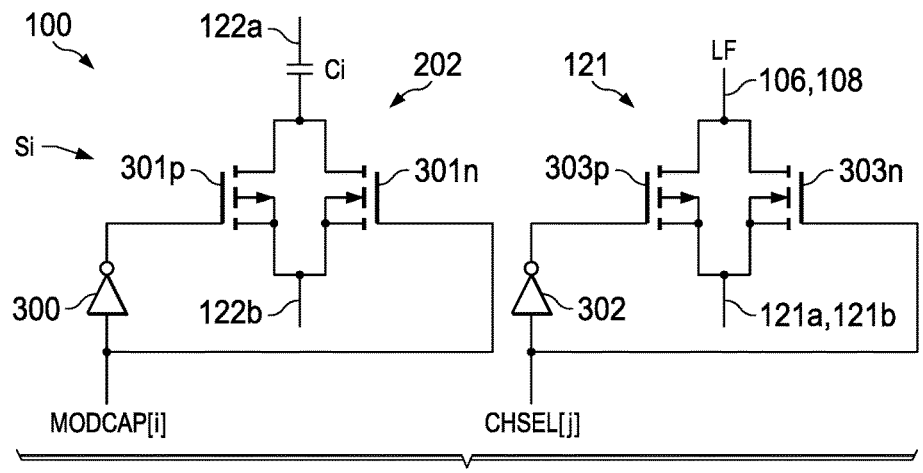
FIG. 3 is a schematic diagram of example switching circuits for channel and capacitor selection in the transponder of FIG. 1.

Referring to FIGS. 1-3, the modulation capacitor 122 in FIG. 2 includes first and second capacitor nodes 122a and 122b including a first capacitor node 122a and a second capacitor node 122b. The channel switching circuit 121 selectively connects the modulation capacitor 122 to a selected signal input node pair 106, 108 and the associated IC terminal pair 103 according to the channel select signal CHSEL. Any suitable switching circuitry 121 can be used. FIGS. 1 and 2 schematically illustrated a set of two single pole, triple throw switches (121a and 121b in FIG. 2) with poles connected to the first and second capacitor nodes 122a and 122b, and selectable connections of the poles to a corresponding selected signal input node 106, 108. As seen in FIGS. 1 and 2, a channel select circuit 124 provides a channel select signal CHSEL to a control input 125 of the shared modulation capacitor circuit 120 to operate the channel switching circuit 121. FIG. 3 shows one example in which the channel switching circuit 121 includes complementary pass gates individually connected between a corresponding one of the capacitor nodes 122a, 122b of the modulation capacitor 122 and a corresponding one of the signal input nodes 106, 108. Only a single complementary pass gate circuit is shown in FIG. 3, with an inverter 302 receiving a corresponding channel select input signal CHSEL[j], where j=1-3. The output signal from the inverter 302 controls the gate voltage of the PMOS transistor 303p, and the signal CHSEL[j] directly controls the gate voltage of the NMOS transistor 303n. In the illustrated example, the circuits 121a and 121b of FIG. 2 each include three complementary pass gates, each of which includes an NMOS transistor 303n and a PMOS transistor 303p as shown in FIG. 3. The channel select circuit 124 in FIGS. 1 and 2 can use any suitable logic to select the particular transponder channel circuit 102 for use in transmitting the uplink data. For example, the uplink transmit channel circuit 102 can be selected according to a maximum downlink communications signal amplitude received from the reader 116 at the corresponding transponder channel circuit 102.

As best shown in FIG. 2, the shared modulation capacitor circuit 120 includes a capacitor array 200 and a modulation control circuit 202 connected to the modulation capacitor 122 to selectively modify a capacitance CM of the modulation capacitor 122 according to the modulation control signal CAPSEL. The capacitor select circuit 126 in FIGS. 1 and 2 provides the control signal CAPSEL to select the modulation capacitance CM as a single control signal or multiple control signals and an input 127 to the shared modulation capacitor circuit 120. The capacitor array 200 example of FIG. 2 includes 8 capacitors C0, C1, C2, C3, C4, C5, C6 and C7, and the modulation control circuit 202 includes 8 corresponding switches S0, S1, S2, S3, S4, S5, S6 and S7. Other implementations are possible in which the capacitor array 200 includes any integer number N capacitors Ci, where N is greater than 1, and the modulation control circuit 202 includes N modulation control switches Si. In certain examples where N is greater than 3, the capacitor selects circuit 126 can provide the control signal CAPSEL to selectively set the shared modulation capacitance CM to one of at least four values, thus allowing four-level FSK modulation for uplink data transmission. The individual capacitors Ci include a first capacitor terminal connected to the first capacitor node 122a and a second capacitor terminal connected to the corresponding switch Si. The individual modulation control switches Si including a first switch terminal connected to the second capacitor terminal of the corresponding capacitor Ci, and a second terminal connected to the second capacitor node 122b as shown in FIG. 2.

In operation, the individual modulation control switches Si electrically connect the second capacitor terminal of the corresponding capacitor Ci to the second capacitor node 122b when a corresponding switch control signal MODCAP[i] is in a first state. The switches Si disconnect the second capacitor terminal of the corresponding capacitor Ci from the second capacitor node 122b when the corresponding switch control signal MODCAP[i] is in a second state. In this manner, the capacitor select circuit 126 provides a N-bit control signal 127 (CAPSEL) including N modulation capacitor switch control signals MODCAP[i], where I=0 through N−1 (e.g., MODCAP[0], MODCAP[1], MODCAP[2], MODCAP[3], MODCAP[4], MODCAP[5], MODCAP[6] and MODCAP[7]). The N switch control signals MODCAP[0,i] individually control the N modulation control switches Si to set the capacitance CM of the modulation capacitor 122 between the first and second capacitor nodes 122a and 122b.

As seen in FIG. 3, in one example, the individual modulation control switches Si are complementary pass gates, each with an NMOS transistor 301n and a PMOS transistor 301p. Only a single one of the control switches Si is shown in FIG. 3. The complementary pass gate switch Si includes an inverter 300 that receives the corresponding switch control signal MODCAP[i] and provides an output to control the gate voltage of the PMOS transistor 301p. The switch control signal MODCAP[i] directly controls the gate voltage of the pass gate NMOS transistor 301n. In this manner, the control signal CAPSEL determines which, if any of the N capacitors Ci is connected between the first and second shared modulation capacitor nodes 122a and 122b. In certain examples, the N capacitors Ci have different capacitance values. In certain examples, moreover, the capacitance values of the N capacitors Ci are binary weighted, although not a strict requirement of all possible embodiments. In the example of FIG. 2, the eight capacitors C0, C1, C2, C3, C4, C5, C6 and C7 have corresponding binary weighted values based on a capacitance unit "C", where C0=C, C1=2C, C2=4C, C3=8C, C4=16C, C5=32C, C6=64C and C7=128C, although not a strict requirement of all possible embodiments. The selection of binary weighted capacitors C0-C7 advantageously facilitates range adjustment to accommodate different transmit antenna inductance values LA, and allows FSK modulation between two or more capacitance values CM according to the modulation control signal CAPSEL. The disclosed examples thus provide easily adaptable solutions, including multichannel transponder integrated circuits 101 and transponder circuitry 100 to transmit uplink data 128 using the transponder antenna circuit 104 associated with the selected transponder channel circuit 102 using FSK communications. In addition, as noted above, the shared modulation capacitor circuit 120 advantageously economizes circuit die space to provide multichannel transponder circuits of any desired number of channels N, and any desired number of FSK transmission levels (e.g., 2FSK, 4FSK). Moreover, the disclosed modulation capacitor circuitry provides for differential capacitor connection to the selected transponder channel circuit 102. As the full bridge rectifier circuits 110 and the limiter circuitry 109 maintain the antenna voltages generally between the reference node voltage VSS and the supply voltage VCL, compact MOFET switching devices can be used for modulation. In one example (2FSK), two distinct data values (e.g., 2fsk1 and 2fsk0) are used to control the capacitor select switches Si. In another example for 4FSK transmission, the configured values (e.g., 4fsk11, 4fsk10, 4fsk01 and 4fsk00) are used for switching control.

Figure 4:
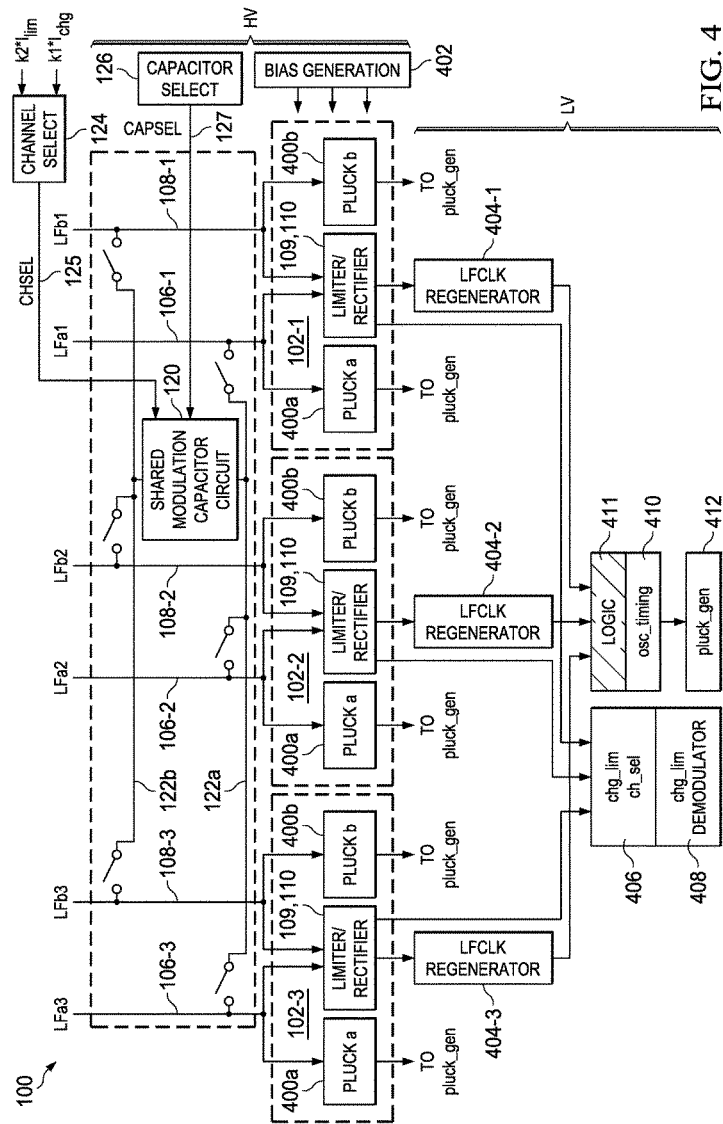
FIG. 4 is a schematic diagram of an example immobilizer including a 3-D transponder of FIGS. 1 and 2.

FIG. 4 shows an example low frequency (LF) immobilizer system implementation including a 3-D transponder circuit 100 as described above in connection with FIGS. 1 and 2. The immobilizer structure in one example is a complex 10 with self-protecting input circuits, which can be implemented in an I/O ring of an integrated circuit die. The immobilizer I/O configuration in one example is divided into a high voltage (HV) portion, a low voltage (LV) portion and a bias generation portion or circuit 402. In one example, the bias generation circuit 402 includes high-voltage components. The shared modulation capacitor circuit 120 of the HV portion is connected to the signal input node pairs 106, 108 by corresponding channel select switches as discussed above. The LV portion of the immobilizer implements demodulator functions, low frequency (LF) field strength comparators with associated filtering, LF clock regenerator circuits 404, uplink oscillator circuitry 410 and 411 with mid clock generator circuitry, and a pluck pulse generator circuit 412. As seen in FIG. 4, the signal input node pairs 106, 108 are also connected to corresponding limiter and rectifier circuitry 109, 110 as shown and described above in connection with FIG. 1. In addition, the individual transponder channel circuits 102 include first and second "pluck" circuits 400a and 400b as shown in FIG. 4. Each channel circuit 102-1, 102-2 and 102-3 has a corresponding low-frequency clock (LFCLK) regenerator circuit 404-1, 404-2 and 404-3. The low-frequency clock regenerator circuits 404 provide input signals to an oscillator timing circuit 410 that includes a logic circuit 411. The pluck circuits 400 and the oscillator timing circuit 410 provide signals to a pluck generator circuit 412. In addition, the limiter circuits 109 provide signals to a charge limiter and channel select circuit 406, and to a demodulator charge limiter circuit 408.

Figure 6:
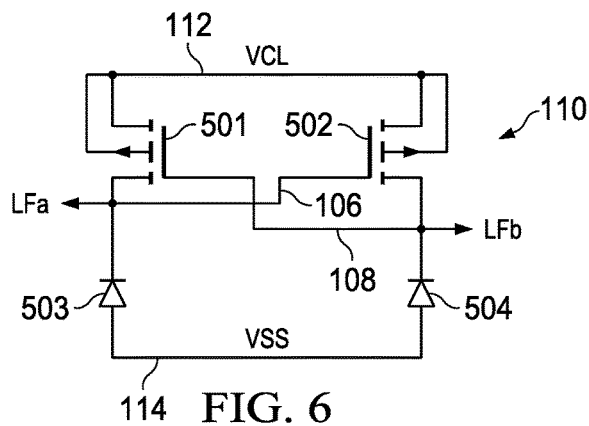
FIG. 6 is a schematic diagram of an example cross-coupled full bridge rectifier circuit in the transponder of FIGS. 1 and 2.
Figure 5:
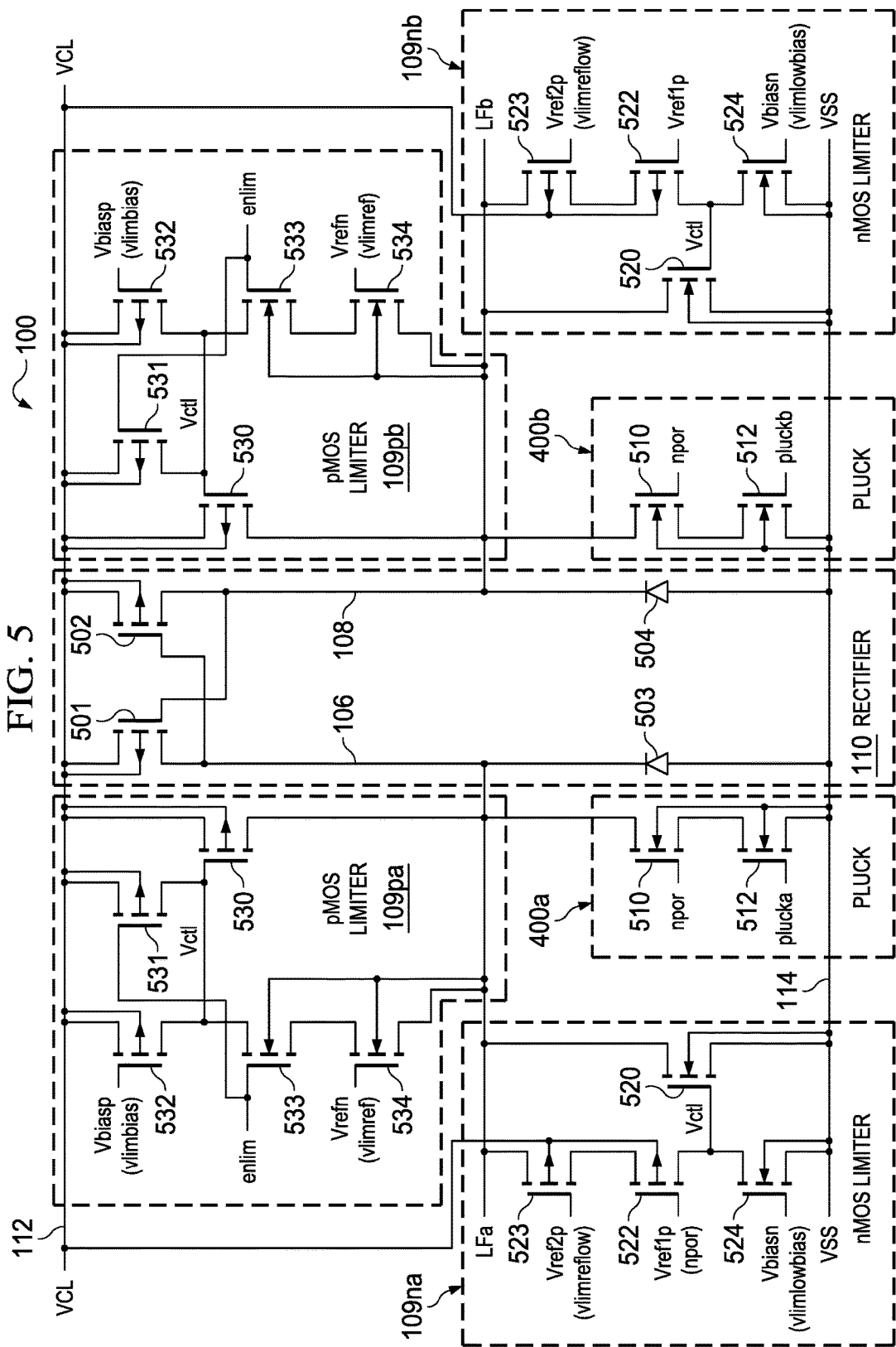
FIG. 5 is a schematic diagram of example rectifier, limiter and pluck circuits in the transponder of FIGS. 1 and 2.

Referring now to FIGS. 5-8 14 and 15, FIG. 5 shows further details of one possible implementation of the rectifier, limiter and pluck circuits 110, 109 and 400 in the high voltage (HV) portion of the transponder circuit 100. As also shown in FIGS. 5 and 6, the circuit components 503, 504 that form the cross-coupled full bridge rectifier circuit 110 carry the charge current and limiter power transistors 530 carry the limiter current in operation of the transponder circuit 100. Elements of the same type but with less width and with the same/similar operating condition are used as current mirrors to deliver mirror current signals, which are a fraction of the charge and limit currents. In certain examples, these current mirror signals indicate the operating condition of the transponder. In one example, the sensed current mirror signals are pulse traces, which occur with a frequency of twice the carrier frequency of the received RF signal, when present.

As shown in FIG. 5, the pluck circuits 400a and 400b each include NMOS transistors 510 and 512 connected in series between the corresponding signal input node 106, 108 and the second supply (reference) node 114 (VSS). The transistors 510 and 512 are respectively operated according to control signals npor and plucka/pluckb.

Figure 14:
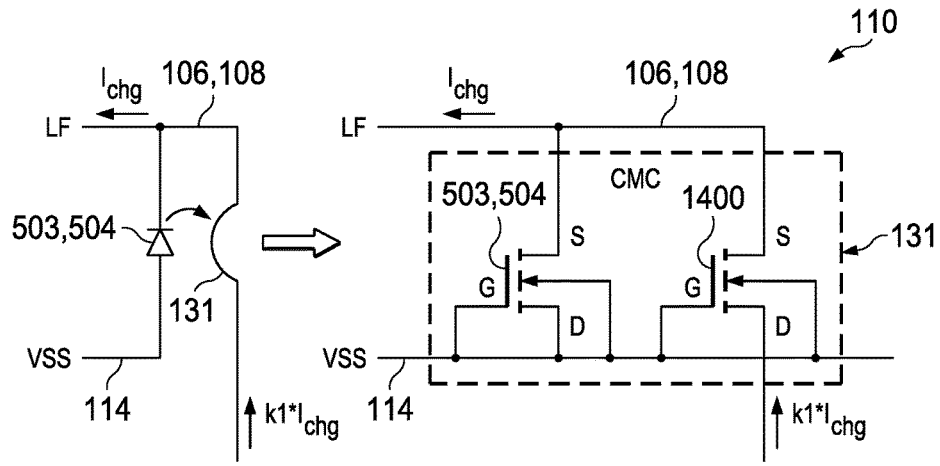
FIG. 14 is a schematic diagram of an example dual rectifier diode current mirror circuit in the transponder of FIGS. 1 and 2.

FIGS. 5 and 6 illustrate an example cross-coupled full bridge rectifier circuit 110 that can be used in the individual transponder channel circuits 102. As best seen in FIG. 6, the rectifier circuit 110 includes cross coupled upper PMOS transistors 501 and 502 connected between the supply voltage node 112 (VCL) and the signal input nodes 106 and 108. The transistors 501 and 502 as well as diodes 503 and 504 provide full bridge rectification. The diode 503 is connected between the reference voltage node 114 (VSS) and the signal node 106, and the diode 504 is connected between the reference node 114 and the signal node 108. In one example, isolated NMOS transistors can be used in a diode-connected configuration to implement the diodes 503 and 504 as shown in FIG. 14. In operation at start up, the transponder supply voltage VCL begins at 0 V, and a low-frequency RF signal LFa, LFb caused by transmission from the reader 116 (FIG. 1) eventually exceeds a threshold voltage VT at the gate terminal of one of the PMOS transistors 501, 502. When either transistor 501 or 502 turns on, charging occurs through the transistor to the supply voltage node 112 to charge the load capacitor CL (FIG. 1). As the RF signal LFa, LFb oscillates, the rectifier circuit transistors 501 and 502 alternately turn on and off to continue charging the load capacitor CL, which increases the supply voltage VCL.

As seen in FIGS. 5, 6 and 14, the full bridge rectifier 110 includes a first half bridge circuit having a first upper transistor 501 connected between the first supply node 112 (VCL) and the first signal input node 106 (LFa). The first half bridge circuit also includes a diode-connected NMOS lower transistor 503 connected between the first signal input node 106 and the second supply node 114 (VSS) to selectively conduct a first rectifier current (charging current) $I_{chg}$. As seen in FIG. 14, the first half bridge circuit also includes a first rectifier current mirror transistor 1400 connected to the diode-connected first lower transistor 503 to form a first rectifier current mirror circuit 131. The current mirror circuit 131 generates a first rectifier mirror current signal $k1*I_{chg}$ proportional to the first rectifier current $I_{chg}$ by a scaling factor k1 based on the relative sizes of the transistors 503/504 and 1400. In one example, the transistor 1400 is smaller than the corresponding transistor 503/504 such that the rectifier mirror current signal $k1*I_{chg}$ is proportionally smaller than the first rectifier current $I_{chg}$. The rectifier circuit 110 in FIGS. 5 and 6 further includes a second half bridge rectifier circuit, with a second upper transistor 502 connected between the supply node 112 and the second signal input node 108. The second half bridge circuit includes a diode-connected second lower transistor 504 connected between the signal input node 108 and the second supply node 114 to selectively conduct a second rectifier current (e.g., $I_{chg}$). A second rectifier current mirror transistor 1400 is connected to the second lower transistor 504 (e.g., as shown in FIG. 14) to form a second rectifier current mirror circuit 131 to generate a second rectifier mirror current signal $k1*I_{chg}$ proportional to the second rectifier current $I_{chg}$.

When an RF signal LFa, LFb generates a field at one or more of the antenna circuits 104, and the supply voltage VCL is not at the maximum level, one of the lower rectifier transistors 503 and 504 conducts the charging current $I_{chg}$ to charge the supply capacitor CL, depending on the polarity of the RF signal LFa, LFb. When $I_{chg}$ flows through either of the transistors 503 and 504, the current mirror circuit 131 generates a rectifier mirror current signal $k1*I_{chg}$. The two rectifier mirror transistors 1400 in one example have drains connected together to form a summing node to provide the $k1*I_{chg}$ signal to the demodulator circuit 130 and to the channel select circuit 124. As shown in FIGS. 5, 6 and 14, the diode connected transistor 503 and 504 and the current mirror transistor(s) 1400 are NMOS transistors with drain and gate terminals connected to the second supply node 114 (VSS). The demodulator circuit 130 generates the signal DEMOD DATA based on the rectifier mirror current signals $k1*I_{chg}$ and on the limiter mirror current signal $k2*I_{lim}$ as described further below in connection with FIGS. 16 and 17.

FIGS. 5, 7, 8 and 15 illustrate details of NMOS and PMOS limiter circuits 109n and 109p and corresponding current mirror circuitry 132. A NMOS limiter circuit 109n and a PMOS limiter circuit 109p are provided for each of the signal input nodes 106 and 108 as shown in FIG. 5 (NMOS limiter circuit 109na and PMOS limiter circuit 109pa connected to the signal input node 106, and limiter circuits 109nb and 109pb connected to the signal input node 108). The limiter circuitry 109 includes a PMOS limiter circuit 109pa and an NMOS limiter circuit 109na connected to the first signal input node 106 (LFa) and limiter circuits 109pb and 109nb connected to the second signal input node 108 (LFb) as shown in FIG. 5. Each of the NMOS limiter circuits 109n (FIG. 7) includes an NMOS power transistor 520 that is controlled by a signal vct1 and is connected between the corresponding signal input node 106, 108 and the lower supply node 114 (VSS). The NMOS limiter circuits 109n also include PMOS transistors 522 and 523 controlled by gate signals vref1p and vref2p, respectively, as well as an NMOS transistor 524 controlled by a gate signal vbias.

Figure 8:
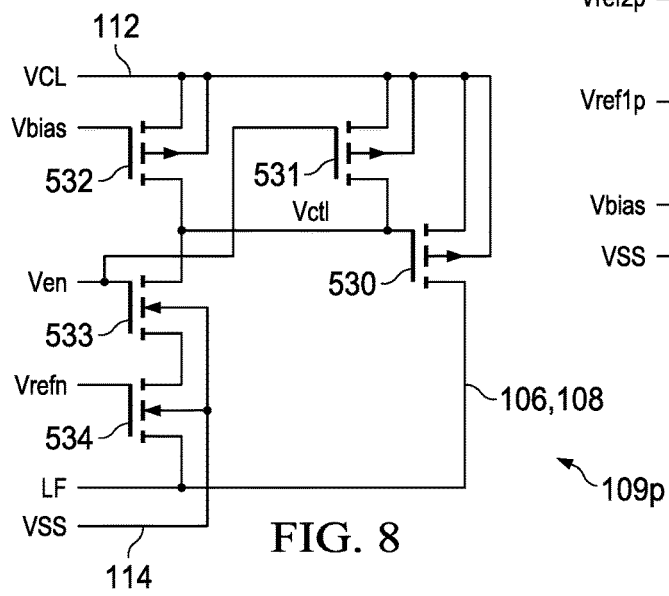
FIG. 8 is a schematic diagram of an example PMOS limiter circuit in the transponder of FIGS. 1 and 2.
Figure 15:
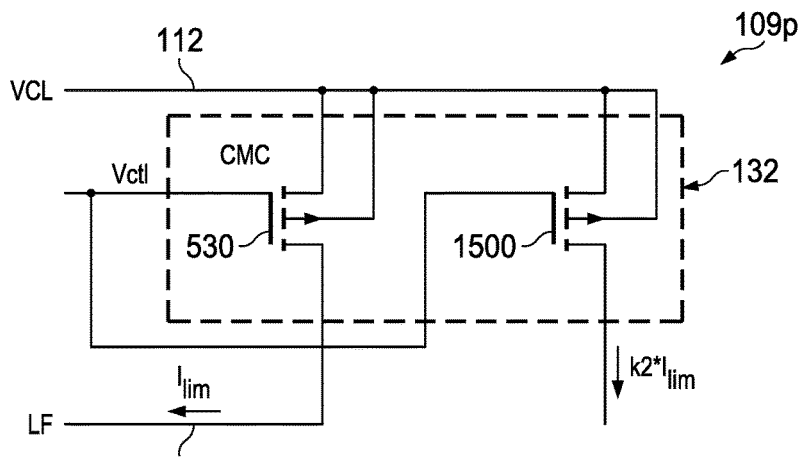
FIG. 15 is a schematic diagram of an example PMOS limiter current mirror circuit in the transponder of FIGS. 1 and 2.

As best seen in FIGS. 8 and 15, each PMOS limiter circuit 109p includes a PMOS limiter power transistor 530 coupled between the first supply node 112 (VCL) and the corresponding signal input node 106, 108. The limiter power transistor 530 selectively conducts a limiter current $I_{lim}$, and is connected to a corresponding limiter current mirror transistor 1500 to form a limiter current mirror circuit 132. The current mirror transistor 1500 of each of the PMOS limiter circuits 109p generates a limiter mirror current signal $k2*I_{lim}$ proportional to the limiter current $I_{lim}$. The transistors 530 and 1500 are proportionally sized and the mirror transistor 1500 is generally smaller than the limiter power transistor 530, such that the limiter mirror current signal $k2*I_{lim}$ is proportionally smaller than the limiter current $I_{lim}$ by a factor k2. The limiter mirror transistors 150 of the first and second PMOS limiter circuits 109*p* are connected together at a summing node or junction to provide a unitary limiter mirror current signal $k2*I_{lim}$ to the channel select circuit 124 and the demodulator circuit 130. The demodulator circuit 130 generates the demodulator data signal DEMOD DATA based on the rectifier mirror current signal $k1*I_{chg}$ and the first and second limiter mirror current signals $k2*I_{lim}$ from each of the transponder channel circuits 102. As shown in FIGS. 5 and 8, the PMOS limiter circuits 109*p* also individually include NMOS transistors 533 and 534 respectively controlled by signals Ven and vrefn, as well as a PMOS transistor 532 controlled by the bias signal vbias.

Figure 7:
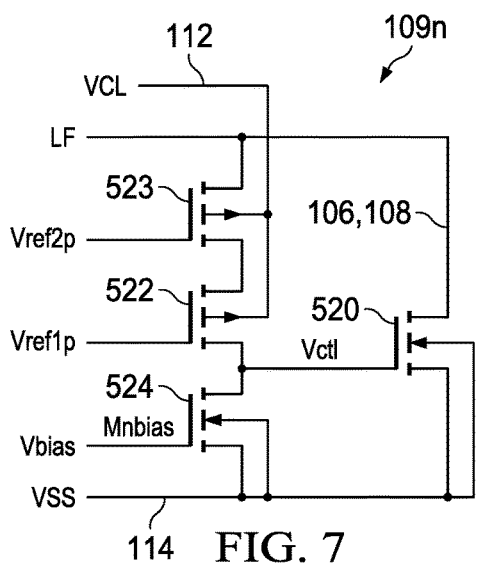
FIG. 7 is a schematic diagram of an example NMOS limiter circuit in the transponder of FIGS. 1 and 2.

The immobilizer circuit in FIG. 5 acts as an electrostatic discharge (ESD) protection circuit and also operates as a low-frequency (LF) overvoltage input protection circuit, which is operative to protect the transponder circuit 100 during powered operation and also with zero supply (VCL=0). The voltage LF in FIGS. 7 and 8 is limited to a value Vlim that is the higher of voltages Vref1*p* and Vref2*p* plus one threshold voltage of a PMOS transistor. A control voltage node Vct1 in FIGS. 7 and 8 is initially discharged to have a defined voltage for the case of no supply. The complementary PMOS limiter circuit in FIG. 8 is enabled by the signal Ven to limit the signal voltage LF relative to the supply voltage VCL to the lower of signal levels Vrefn minus the threshold voltage of the NMOS transistors. The reference and enable signals are generated by a separate circuit (not shown) in one example, to enable the PMOS limiter circuitry once the supply voltage VCL>3V. The NMOS limiter circuit 109*n* limits both the voltages LF and VCL, since the rectifier circuitry 110 ties VCL to LF. With no supply voltage (e.g., VCL=0), the NMOS limiter circuit 109*n* limits the input voltage/VCL to Vref1*p* plus one PMOS transistor voltage drop (VTP), which is high enough for a bandgap circuit to start up and release the reset. In this mode, Vref2*p* is 0 and the PMOS limiter circuit 109*p* is disabled. After the reset is released, Vref2*p* is set to VCL to provide a limiter function for LF voltages above VCL plus VTP in case of common mode signals while the PMOS limiter circuit 109*p* remains disabled. When the supply voltage VCL exceeds 3V (or other predefined level), the PMOS limiter circuit 109*p* is enabled with a reference voltage of approximately one PMOS transistor voltage drop (VTP). In this manner, the amplitude of the LF voltage is limited to the supply voltage VCL. In one example, with a nominal supply voltage VCL of 3.0 V, the limiter circuitry 109 limits the maximum gate voltage of the transistors to approximately 3.6V.

A reference voltage generator (not shown) operates in three different modes. On power up with a band gap not yet working, the NMOS limiters 109*n* operate with a reference signal vlimreflow. In a second mode with the band gap working, but VCL<3V, the LF voltage (FIG. 7) is limited by the rectifying mechanism to VCL plus a diode voltage. When the band gap is operating for VCL>3V, the PMOS limiter is activated in the third mode with reference signals enlim and vlimref. The signal vlimreflow is used for the NMOS limiters 109*n*. This limits the LF voltage to vlimreflow plus a PMOS transistor voltage drop (VTP) relative to VSS. In the presence of the LF signal (e.g., during power up by LF) the supply voltage VCL is also limited. The limited supply voltage is higher than the startup voltage of the bandgap and less than a predetermined value (e.g., 3V. The signal vlimreflow in one example is provided by a passive resistor/divider diode structure to facilitate reliable startup. In one example, the signal enlim is created by comparing the (divided) supply voltage with the bandgap voltage using an active bandgap, and an additional passive pull-down is used for reliable startup. The signal vlimref is derived from the signal enlim and is approximately one NMOS transistor voltage drop (VTN) above VSS. This limits LF to approximately VSS, and no further charging of the load capacitor CL occurs.

Figure 9:
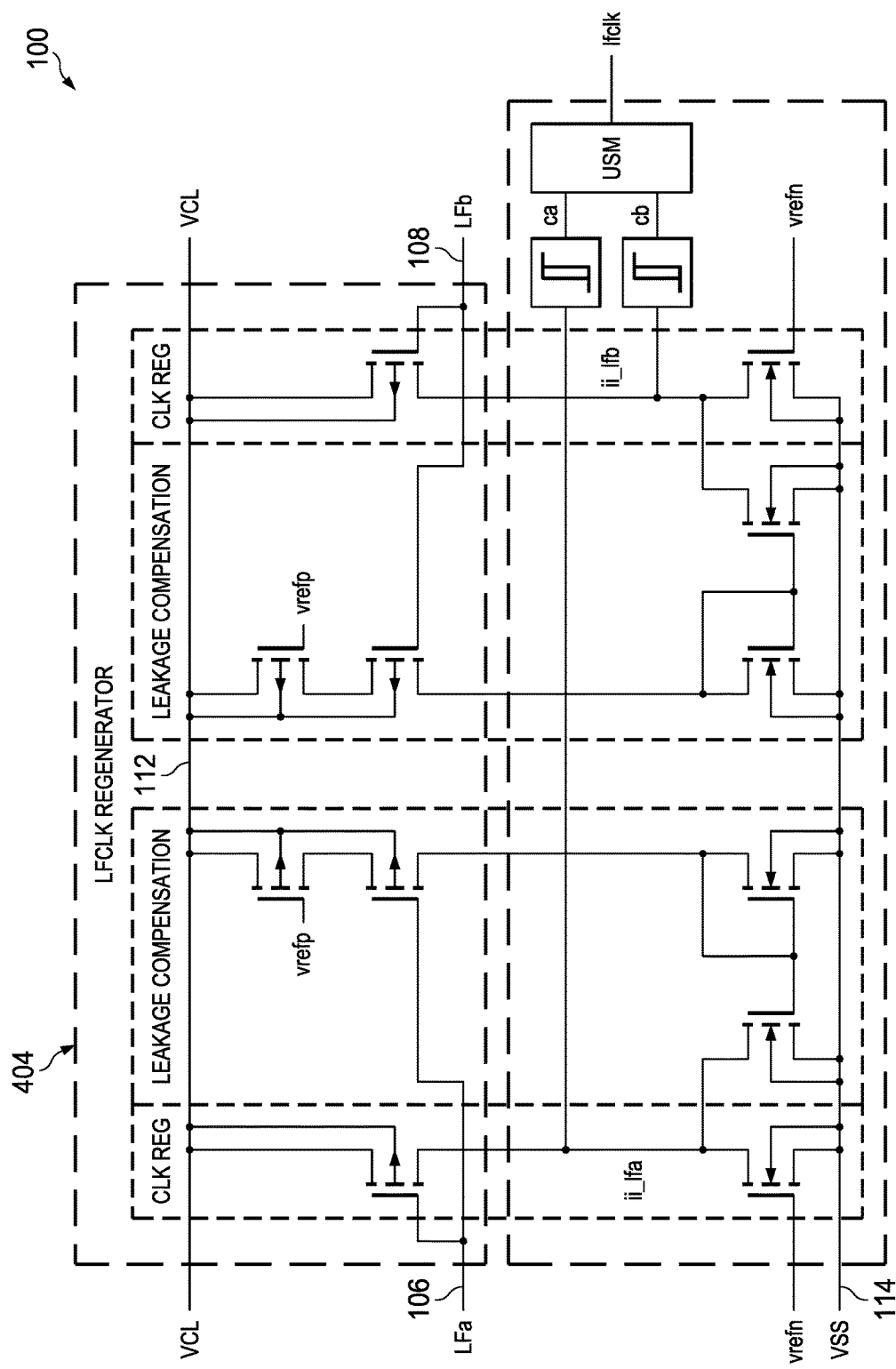
FIG. 9 is a schematic diagram of an example clock regenerator circuit in the transponder of FIGS. 1 and 2.
Figure 10:
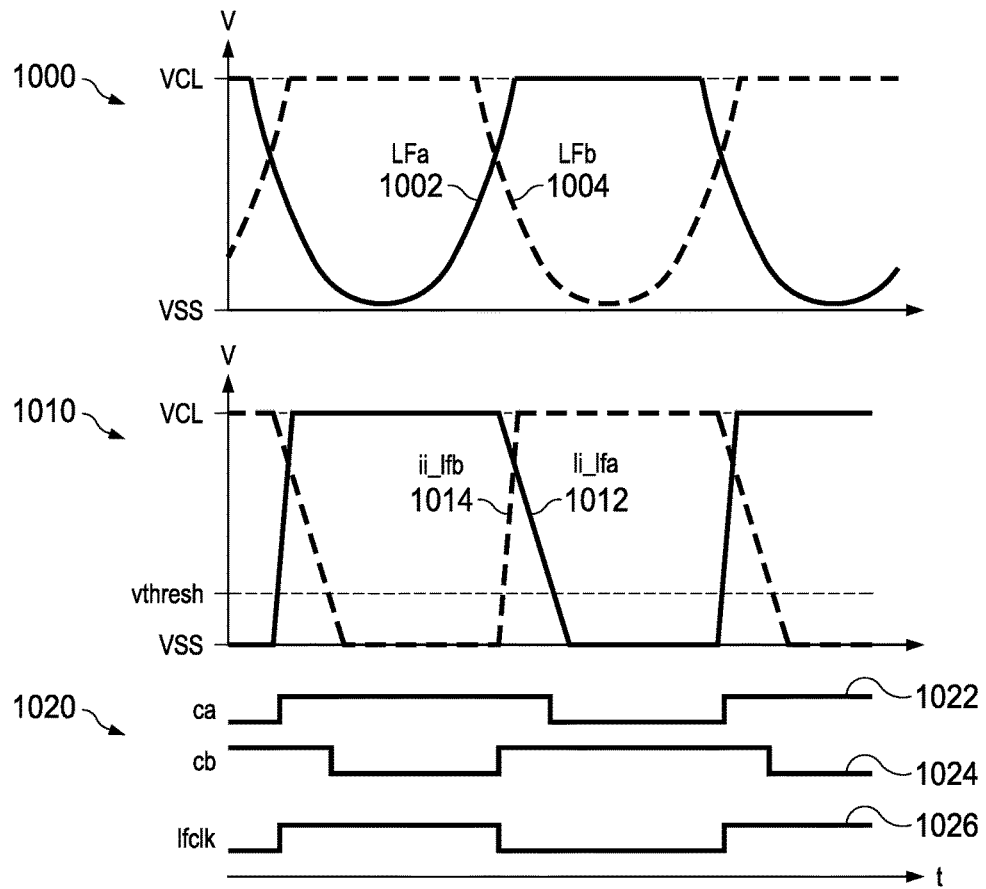
FIG. 10 is a signal diagram of clock regenerator waveforms.

Referring now to FIGS. 4, 9 and 10, FIG. 9 shows a clock regenerator circuit example 404 and FIG. 10 shows clock regenerator waveforms in the circuit of FIG. 9. A graph 1000 in FIG. 10 illustrates example RF signal voltage curves 1002 (LFa) and 1004 (LFb), and a graph 1010 illustrates curves 1012 (ii_lfa) and 1014 (ii_lfb) representing signal waveforms in the circuit 404 of FIG. 9. In addition, a graph 1020 in FIG. 10 illustrates a ca waveform 1022, a cb waveform 1024 and a low-frequency clock signal waveform 1026 (lfclk) produced by the clock regenerator circuit 404. The clock regenerator (clkreg in FIG. 9) consists of a pair of PMOS transistors with the gate connected to Lf working against an NMOS constant current source. The output signals ii_lfx feed a comparator (with comparator threshold vthresh, not shown in FIG. 9). The example circuit in FIG. 9 includes hysteresis comparator circuits that generate outputs ca and cb, respectively shown as curves 1022 and 1024 in FIG. 10. In one example, the signals ca and cb are raw LF clock signals that may include duty cycle distortion. A USM circuit removes the duty cycle distortion, and provides the output signal lfclk shown as curve 1026 in FIG. 10. The LF regenerator circuit 404 includes current source circuitry for clock regeneration for each of the LFa and LFb signals, as well as leakage compensation circuitry to provide a clock signal lfclk based on the RF signals LFa and LFb at the signal input nodes 106 and 108. In one example, current in an NMOS constant current source is low to keep the quiescent current low. For high temperature and fast PMOS process corner, the leakage of the clkreg PMOS could be higher than this current, so that the ii_lfa/b would never go below a threshold voltage vthresh. In one example, the leakage current is compensated. For the PMOS off state, the resulting leakage current is added to the NMOS current source to compensate for the leakage. For the PMOS on state, the current of the leakage compensation is limited by a vrefp biased PMOS constant current source. Leakage compensation is advantageous for implementations using low threshold voltage PMOS transistors, and may be omitted in other implementations. For clarity the bias generation, cascode transistors and power down circuits are not shown in FIG. 9.

Figure 11:
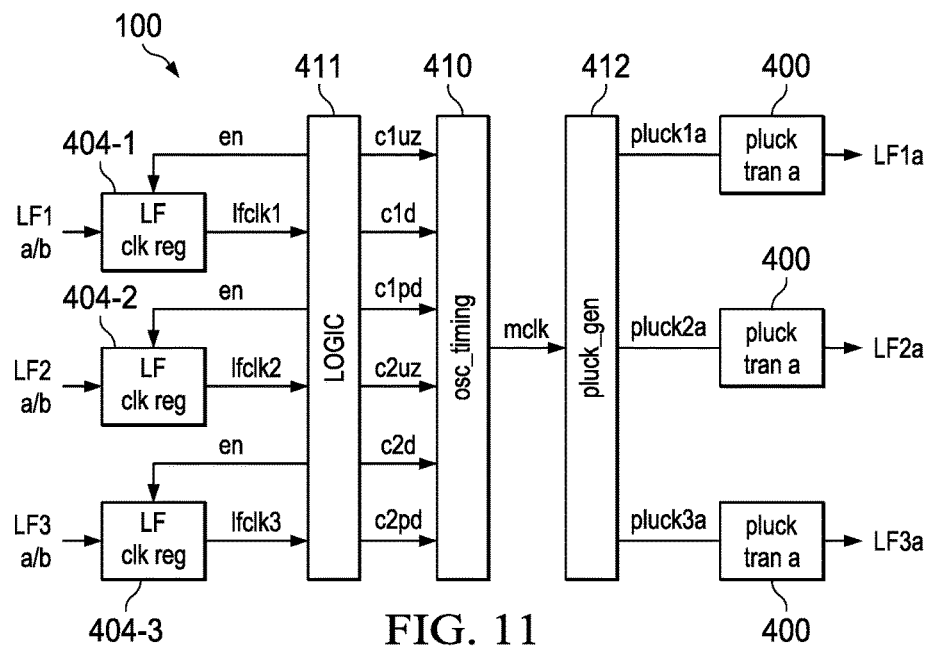
FIG. 11 is a schematic diagram of an uplink oscillator circuit in the transponder of FIGS. 1 and 2.
Figure 12:
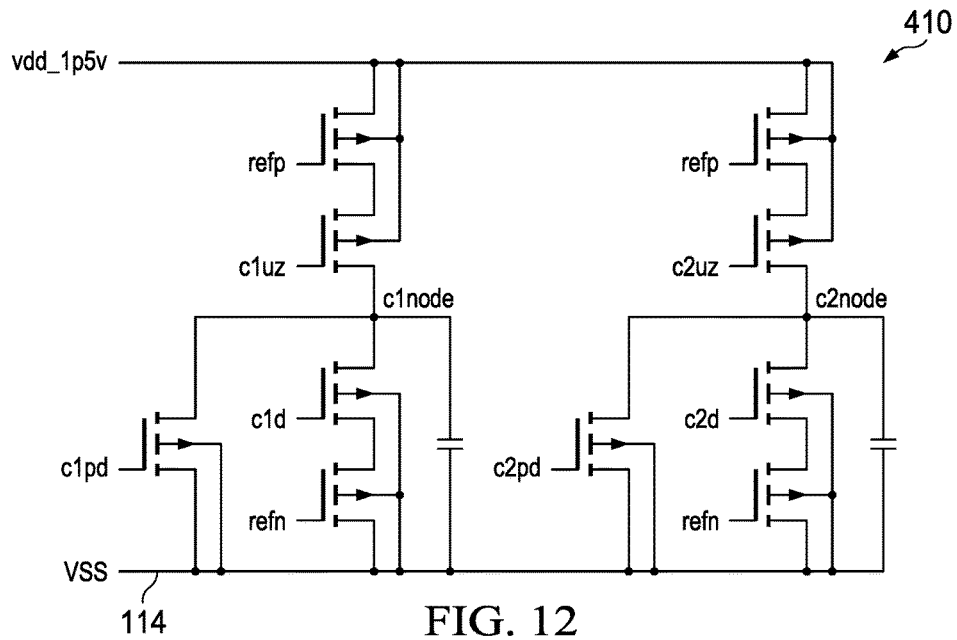
FIG. 12 is a schematic diagram of an example dual slope oscillator timing circuit in the transponder of FIGS. 1 and 2.
Figure 13:
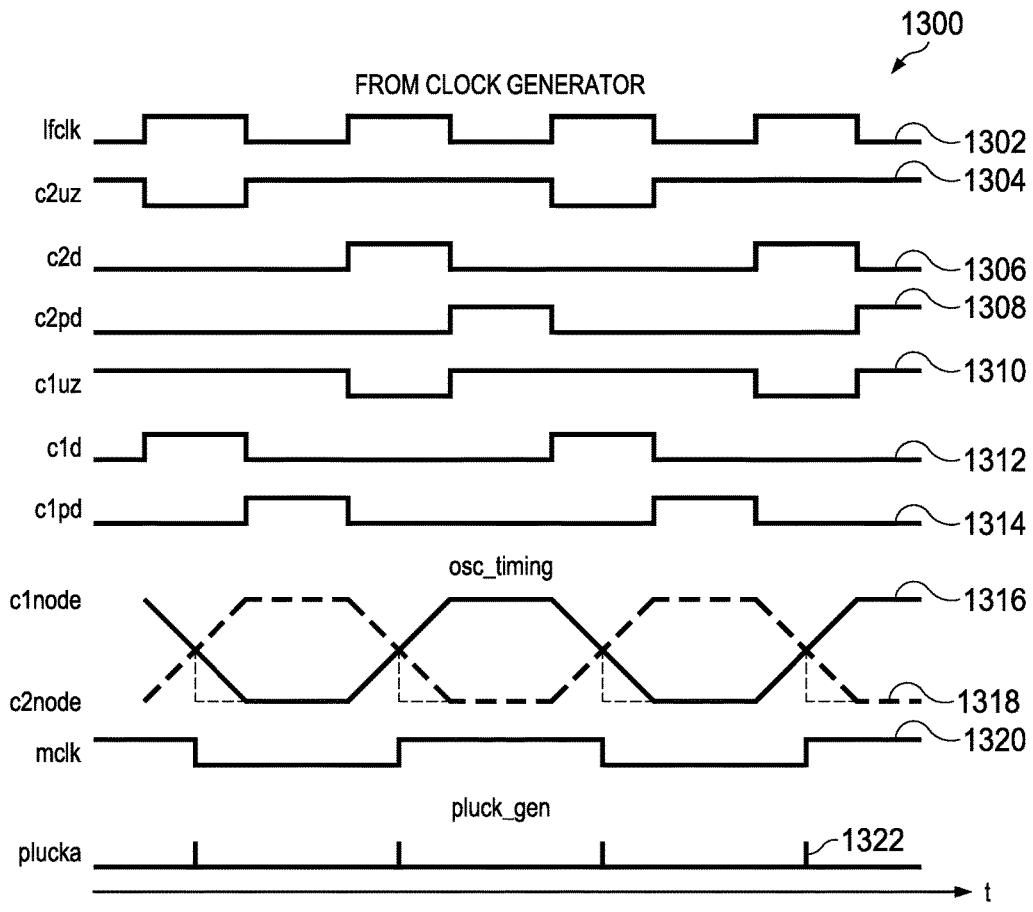
FIG. 13 is a signal diagram of uplink oscillator waveforms.

Referring now to FIGS. 11-13, FIG. 11 shows an example uplink oscillator circuit in the transponder of FIGS. 1 and 2. The uplink oscillator circuit in FIG. 11 includes LF clock regenerator circuits 404-1, 404-2 and 404-3 that receive the associated RF signals LFa, LFb and provide enable signals en and LF clock signals lfclk1, lfclk2 and lfclk3 to a logic circuit 411. The logic circuit 411 provides two sets of capacitor control signals to an oscillator timing circuit 410, including up or charging signals for capacitors c1 and c2 (c1*uz* and c2*uz*) as well as discharging and pre-discharging signals c1*d*, c1*pd*, c2*d* and c2*pd*. The logic circuit 410 provides a mid-clock signal mclk to the pluck generator circuit 412. The pluck generator circuit 412, in turn, receives three signals pluck1*a*, pluck2*a* and pluck3*a* from the corresponding pluck transistor circuits 400*a*, as also shown in FIG. 4 above. FIG. 12 shows an example oscillator timing circuit 410, and FIG. 13 provides a graph 1300 showing signal waveforms in the oscillator timing circuit 410. The graph 1300 includes a curve 1302 showing the lfclk signal, curve 1304 showing the c2$uz$ signal, a curve 1306 illustrating the c2$d$ signal and a curve 1308 illustrating an example c2$pd$ signal. In addition, FIG. 13 includes a curve 1310 showing the c1$uz$ signal, curve 1312 showing the c1$d$ signal and a curve 1314 showing the c1$pd$ signal in the circuit 410. The graph 1300 also includes oscillator timing curves 1316 (c1node), 1318 (c2node) and 1320 illustrating the mid-clock signal mclk, along with a pluck generator output signal curve 1322 (plucka). In operation, two capacitors are alternatingly charged up (e.g., cxu) and discharged (e.g., cxd) for the on-phase of the clock via the dual slope oscillator timing circuitry in order to generate the mid-clock signal mclk. The uplink oscillator (FIG. 11) uses the antenna resonant circuit to set the oscillation frequency via the received LFa and LFb RF signals. The immobilizer logic circuit 411 enables the clock regenerator of the selected antenna/transponder channel circuit 102 and creates the control signals for the oscillator timing circuit 410. These signals from the logic circuit 411 are synchronous to the LF clock. The oscillator timing circuit 410 uses a dual slope approach to identify the middle time of the clock phase as shown in FIGS. 12 and 13. In operation, this circuitry identifies the middle of the on phase (mclk) as the crossing of the capacitor voltage is for the same charge and discharge currents. Upon detection of this crossing, the circuitry discharges the capacitor with the falling edge to suppress chatter in one example. In addition, this capacitor is kept discharged via pre-discharge signals cxpd.

The edge detection with a digital delay and an exclusive OR (XOR) of the signal mclock creates pulses, which control the pluck structure. The length of the pluck pulse is not critical, and a longer pulse can be selected by DfT features in the pluck generator circuit. This pulse replaces energy loss in the antenna resonant circuit and sustains the oscillation. An offset of the comparator and differences between capacitors are averaged out within two oscillations. An offset between charge and discharge currents leads to a deviation from the ideal mid, which is used to compensate for the delay of the clock regenerator. The pluck circuitry in one example includes two transistors in series, one of which is connected to npor to avoid unintended plucking during power up. For the oscillator, only one pluck structure at LFxa is required, but the identical structure is placed at LFxb in certain examples.

Referring now to FIGS. 4 and 14-17, the demodulator circuit 130 uses a current mirror technique to ascertain current flow in the rectifier and limiter circuit components (e.g., 503, 504, 530) which carry the charge current $I_{chg}$ or the limit current $I_{lim}$ in FIG. 4. As discussed above, this circuitry is replicated for each of the individual transponder channel circuits 102 (FIG. 1), and provides signals that can be used by the transponder IC 1012 intelligently select the particular transponder channel for use in uplink communications based on various factors, such as received signal strength of downlink communications from the reader 116. FIG. 14 illustrates a rectifier diode current mirror circuit 503,504/1400, which can be used to measure the current flowing in the diode-connected NMOS transistor 503 or 504 of the rectifier circuit 110. In this case, charging current $I_{chg}$ flows from the corresponding individual signal input node 106 or 108 to charge the load capacitor CL (FIG. 1) to establish or maintain the supply voltage VCL. On the left side of FIG. 1, a current mirror circuit 131 is schematically shown to conduct the mirrored current k1*$I_{chg}$ that is proportional to the charging current $I_{chg}$ used to charge the load capacitor CL. The right side of FIG. 14 illustrates a circuit example using a diode-connected NMOS transistor 503, 504 to implement the lower rectifier diode, as well as a corresponding NMOS current mirror transistor to provide the mirrored current signal k1*$I_{chg}$. In operation, circuitry 124, 130 of the transponder IC 101 can use the mirrored current signal k1*$I_{chg}$ in operation of the transponder circuits 102 and/or the communications circuitry of the IC 101 based on the charging condition or state of the rectifier circuit 110 and/or of the supply voltage VCL and the load capacitor CL. FIG. 15 shows an example of current mirroring to derive the limiter current signal k2*$I_{lim}$ corresponding to the limiter current $I_{lim}$ in the PMOS limiter circuits 109$p$ (also shown in FIGS. 4 and 8 above).

Figure 16:
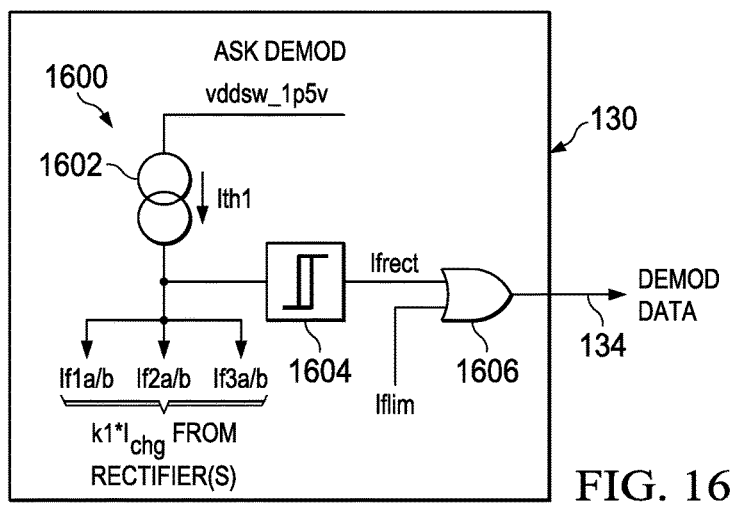
FIG. 16 is a schematic diagram of an example diode mirror current signal generator circuit in the transponder of FIGS. 1 and 2.

FIG. 16 illustrates an example diode mirror current signal generator circuit 1600 with a reference or threshold current source 1602 and a hysteresis comparator circuit 1604 (e.g., a Schmitt trigger) in the transponder 100 of FIGS. 1 and 2. The current source 1602 operates from a reference voltage signal vddsw_1$p$5$v$ to provide a current signal divided into the charge current signals ($I_{chg}$) from the LFa and LFb sides of the three rectifier circuits 110. The comparator circuit 1604 compares the voltage of the lower terminal of the current source 1602 with a reference. The comparator circuit 1604 generates a first comparator output signal Ifrect having a first state (e.g., high) when the rectifier mirror current signal k1*$I_{chg}$ is greater than a first threshold current Ith1 delivered by the current source 1602. The comparator circuit 1604 generates the signal Ifrect a different second state (e.g., low) when the signal k1*$I_{chg}$ is less than or equal to the first threshold current Ith1. The demodulator circuit 130 also includes a logic circuit, for example an OR gate 1606 to generate the demodulator data signal DEMOD DATA.

Figure 17:
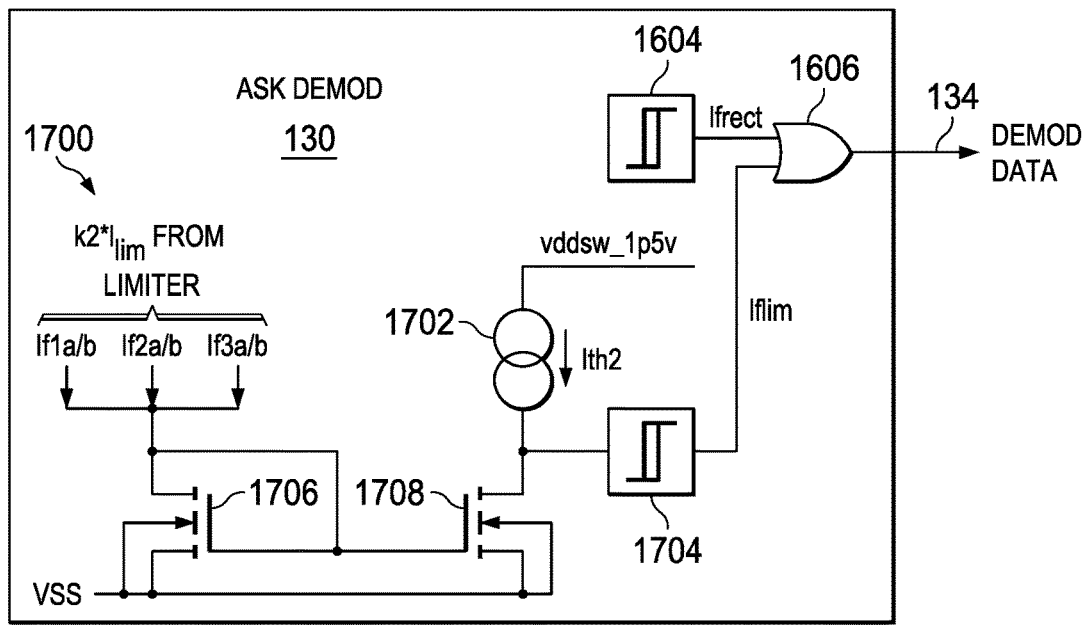
FIG. 17 is a schematic diagram of an example limiter mirror current signal generator circuit in the transponder of FIGS. 1 and 2.

FIG. 17 is a shows an example limiter mirror current signal generator circuit 1700 in the transponder of FIGS. 1 and 2. The circuit 1700 includes a reference current source 1702 that operates from the supply voltage signal vddsw_1$p$5$v$. The limiter current mirror signals $I_{lim}$ from the circuit of FIG. 15 for each of the three transponder channels are summed at a summing node and provided to a current mirror transistor 1706. The summed limiter current is mirrored to a second transistor 1708 connected in series with the reference current source 1702. The circuit 1700 also includes a hysteresis comparator circuit (e.g., Schmitt trigger) 1704 that compares the lower terminal of the reference current source 1702 with a threshold and provides a limiter current level signal Iflim. The second comparator circuit 1704 generates a second comparator output signal Iflim having a first state (e.g., high) when the limiter mirror current signal k2*$I_{lim}$ is greater than a second threshold current Ith2 from the current source 1702. The second comparator circuit 1704 generates the Iflim signal in a different second state (e.g., low) when the limiter mirror current signal k2*$I_{lim}$ is less than or equal to the second threshold current Ith2. The OR gate 1606 generates the signal DEMOD DATA in a first state (e.g., high) when either signal Ifrect or a signal Iflim is in the first state (e.g., high) to indicate the presence of the threshold amount of energy in the RF signal LFa, LFb. The logic in FIG. 16 generates the signal DEMOD DATA in a different second state (e.g., low) when the signals Ifrect, and Iflim are both in a second state (e.g., low) to indicate the absence of the threshold amount of energy in the RF signal LFa, LFb.

Figure 18:
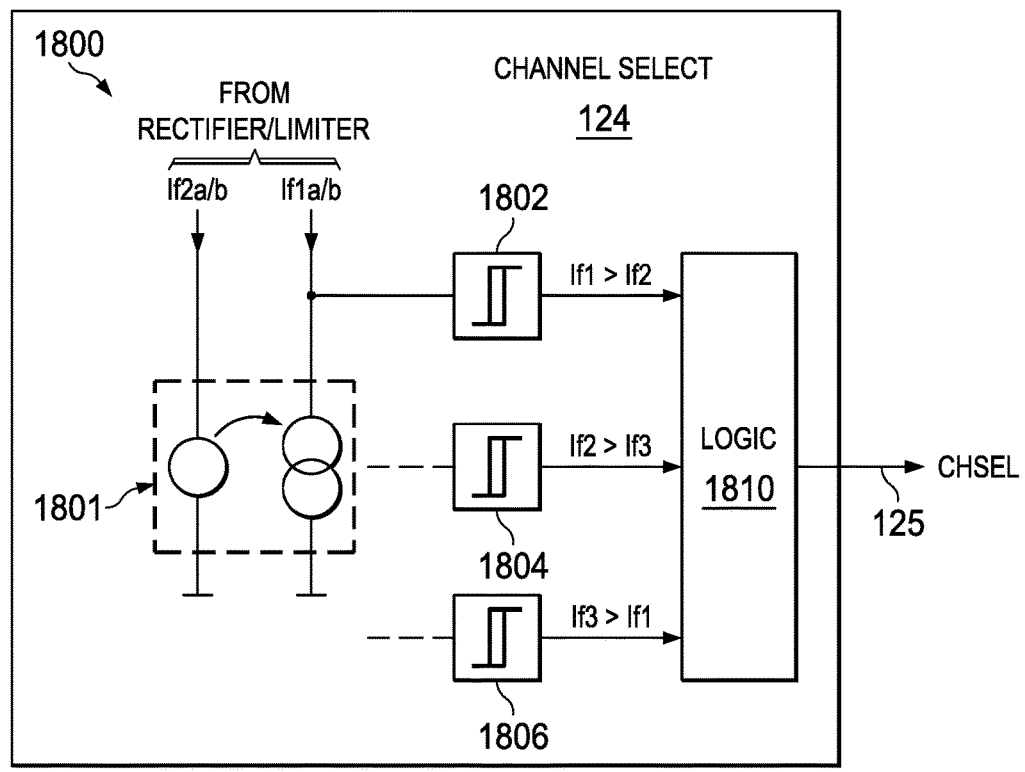
FIG. 18 is a schematic diagram of an example field strength comparator circuit in the transponder of FIGS. 1 and 2.
Figure 19:
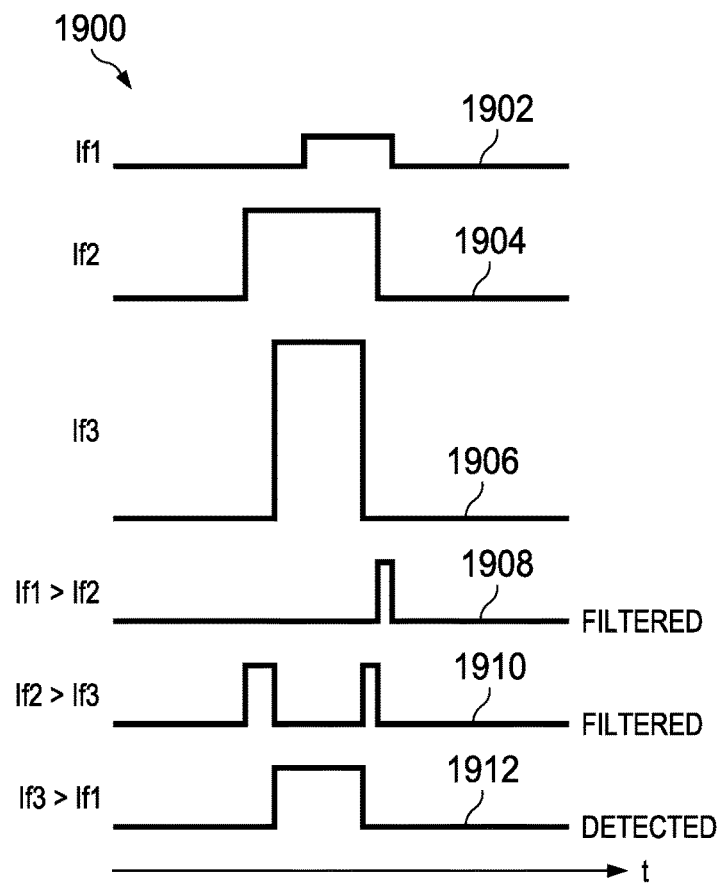
FIG. 19 is a signal diagram of field strength comparator waveforms.

Referring now to FIGS. 18 and 19, the current mirror circuits 131 and 132 also provide the signals k1*$I_{chg}$ and k2*$I_{lim}$ for the individual transponder channel circuits 102

(FIG. 1) to the channel select circuit 124 for use in determining the relative field strengths of the RF signal received by the corresponding antenna circuits 104. FIG. 18 shows an example field strength comparator circuit 1800 in the transponder of FIGS. 1 and 2. FIG. 19 is a signal diagram 1900 that shows an example field strength comparator signal sequence before filtering in the circuit 1800 of FIG. 18. FIG. 19 shows example signal curves 1902 (lf1), 1904 (lf2) and 1906 (lf3) representing sensed currents in the respective first, second and third transponder channel circuits 102-1, 102-2 and 102-3 of FIG. 1. The channel select circuit 124 in this example includes a summing circuit to sum the rectifier mirror current signal k1*$I_{chg}$ and the limiter mirror current signal k2*$I_{lim}$ to create a field strength signal lfa/b for each of the individual transponder channel circuits 102. A set of three comparator circuits 1802, 1804 and 1806 each compare the field strength signals lfa/b of one of the pairs of transponder channels and generate a corresponding comparator output.

A current mirror circuit 1801 in FIG. 18 mirrors a current sense signal from the second transponder circuit 102-2. A summing junction sums the mirrored current signal with a current sense signal from the first transponder circuit 102-1. A first hysteresis comparator circuit 1802 compares the resulting summing junction voltage with a threshold and generates a first comparator signal having a first state (e.g., low or logic"0") when lf1 is less than or equal to lf2, and a different second state (e.g., high or logic "1") when lf1 is greater than or equal to lf2. The output signal of the comparator 1802 is filtered using a low pass filter circuit (not shown) in one example. The filtered comparator output signal is shown as curve 1908 in FIG. 19 (1f1>lf2). The circuit 1800 includes further mirror circuits (not shown) and corresponding hysteresis comparators 1804 and 1806 and (and optionally associated output filters, not shown) to generate signals for the other two comparisons lf2>lf3 (curve 1910 in FIG. 19) and lf3>lf1 (curve 1912). In one example, the field strength comparators of the circuit 1800 use the same mirrored sense currents that are used for the demodulator, where the mirrored sensed currents are proportional to the field strength, the current pulses have similar widths, and the current pulses occur with only a minor shift. In the example of FIG. 19, the curves 1902, 1904 and 1906 show the current pulses with different heights (for one half the LFa or LFb RF signal period), and the curves 1908, 1910 and 1912 illustrate the resulting comparator outputs.

A logic circuit 1810 receives the comparator outputs and includes an output 125 that generates a channel select signal CHSEL to select a particular one of the transponder channel circuits 102 for transmitting uplink data. In one example, the logic 1810 selects the channel having the highest received signal strength. For example, antenna 1 is compared with antenna 2, antenna 2 with antenna 3, and finally antenna 3 is compared with antenna 1. The resulting signal lf1>lf2 indicates, that the field strength of antenna 1 is higher than the field at antenna 2, and similar comparisons are made for the comparator signals lf2>lf3 and lf3>lf1. The logic 1810 uses these signals to generate the channel select signal CHSEL to select the channel circuit 102 with the highest signal strength for connection to the shared uplink modulation capacitor circuit 120 as described above. In one example, the channel select circuit 124 uses the rectifier and limiter mirror current signals, and the signals used depend on the state of the device as determined by the demodulator signals. In certain implementations, the currents and the mirrored sense signals k1*$I_{chg}$ and k2*$I_{lim}$ are proportional to the field strength, have generally similar widths and the current pulses occur with little or no phase shift. The difference between currents is compared, and results in digital pulses. The pulses are filtered in certain examples to suppress short pulses as seen in FIG. 19. The curves 10902, 1904 and 1906 show example current pulses with different heights (e.g., for one half period of the RF signal carrier).

Figure 20:
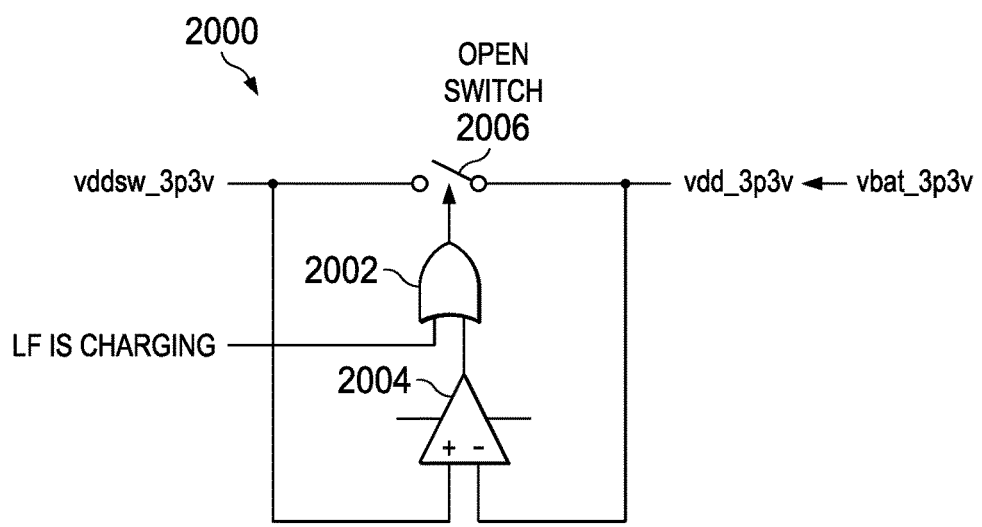
FIG. 20 is a schematic diagram of an example immobilizer power switch circuit in the transponder of FIGS. 1 and 2.

FIG. 20 shows an example immobilizer power switch circuit 2000 with an AND gate 202, a comparator 2004 and a power switch 2006 in the transponder circuitry 100 of FIGS. 1 and 2. The switch circuit 2000 in one example uses the same signal $I_{chg}$ (or k1*$I_{chg}$) that is used for the demodulator in order to control the switch 2006 between VCL (shown as vddsw_3p3v) and a battery supply voltage vdd_3p3v. In this example, a default state of the switch is closed, so that vbat_3p3v can supply vddsw_3p3v via the internal voltage vdd_3p3v. When vddsw_3p3v is greater than vdd_3p3v or the LF field is charging vddsw_3p3v, then the switch 2006 is opened by the comparator 2004 and the AND gate 2002.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A transponder circuit, comprising:
    a signal input node pair to receive a radio frequency (RF) signal from an associated transponder antenna circuit, the signal input node pair including a first signal input node, and a second signal input node;
    a rectifier circuit, including:
        a rectifier power transistor connected to one of the first and second signal input nodes to selectively conduct a rectifier current to generate or maintain a supply voltage from the RF signal received at the signal input node pair, and
        a rectifier current mirror transistor connected to the rectifier power transistor to form a rectifier current mirror circuit to generate a rectifier mirror current signal proportional to the rectifier current;
    a limiter circuit, including:
        a limiter power transistor connected to one of the first and second signal input nodes to selectively conduct a limiter current corresponding to the RF signal to limit a voltage of the signal input node pair when the rectifier transistor is not conducting, and
        a limiter current mirror transistor connected to the limiter power transistor to form a limiter current mirror circuit to generate a limiter mirror current signal proportional to the limiter current; and
    a demodulator circuit to receive the rectifier mirror current signal and the limiter mirror current signal, the demodulator circuit configured to generate a binary demodulator data signal representing the presence or absence of a threshold amount of energy in the RF signal received at the signal input node pair based on the rectifier mirror current signal and the limiter mirror current signal.

2. The transponder circuit of claim 1, wherein the demodulator circuit includes:
    a first comparator circuit to generate a first comparator output signal having a first state when the rectifier mirror current signal is greater than a first threshold current, and a second state when the rectifier mirror current signal is less than or equal to the first threshold current;

a second comparator circuit to generate a second comparator output signal having a first state when the limiter mirror current signal is greater than a second threshold current, and a second state when the limiter mirror current signal is less than or equal to the second threshold current; and a logic circuit to generate the demodulator data signal in a first state when either of the first and second comparator output signals is in the first state to indicate the presence of the threshold amount of energy in the RF signal, and to generate the demodulator data signal in a second state when the first and second comparator output signals are both in the second state to indicate the absence of the threshold amount of energy in the RF signal.

3. The transponder circuit of claim 2, further comprising:

a plurality of transponder channel circuits, individually including:
   a signal input node pair to receive a radio frequency signal from an associated transponder antenna circuit, the individual signal input node pairs including a first signal input node, and a second signal input node,
   a rectifier circuit, including:
      a rectifier power transistor connected to one of the first and second signal input nodes to selectively conduct a rectifier current to generate or maintain a supply voltage from the RF signal received at the signal input node pair, and
      a rectifier current mirror transistor connected to the rectifier electrical component to form a first current mirror circuit to generate a rectifier mirror current signal proportional to the rectifier current, and
   a limiter circuit, including:
      a limiter power transistor connected to one of the first and second signal input nodes to selectively conduct a limiter current corresponding to the RF signal to limit a voltage of the signal input node pair when the rectifier transistor is not conducting, and
      a limiter current mirror transistor connected to the limiter transistor to form a second current mirror circuit to generate a limiter mirror current signal proportional to the limiter current; and
   wherein the demodulator circuit generates the demodulator data signal based on the rectifier mirror current signals and the limiter mirror current signals from the individual transponder channel circuits.

4. The transponder circuit of claim 3, further comprising a channel select circuit, including:

a summing circuit to sum the rectifier mirror current signal and the limiter mirror current signal to create a field strength signal for each of the individual transponder channel circuits;

a third comparator circuit to compare the field strength signals corresponding to first and second transponder channel circuits, and to generate a third comparator output signal having a first state when the field strength signal corresponding to the first transponder channel circuit is greater than the field strength signal corresponding to the second transponder channel circuit, and a second state when the field strength signal corresponding to the first transponder channel circuit is less than or equal to the field strength signal corresponding to the second transponder channel circuit; and a logic circuit with an output to generate a channel select signal to select a particular one of the transponder channel circuits for transmitting uplink data.

5. The transponder circuit of claim 4, further comprising a modulation capacitor circuit, including:

a modulation capacitor, including a first capacitor node, and a second capacitor node; and a channel switching circuit to selectively connect the capacitor nodes of the modulation capacitor to a selected one of the transponder channel circuits according to the channel select signal.

6. The transponder circuit of claim 3, further comprising:

a channel select circuit to generate a channel select signal indicating a particular one of the transponder channel circuits having a highest received field strength based on the rectifier mirror current signals and the limiter mirror current signals from the individual transponder channel circuits;

a modulation capacitor, including a first capacitor node, and a second capacitor node; and a channel switching circuit to selectively connect the first and second capacitor nodes of the modulation capacitor to the particular one of the transponder channel circuits according to the channel select signal.

7. The transponder circuit of claim 1, wherein the rectifier circuit is a full bridge rectifier, including:
   a first half bridge rectifier circuit, including:
      a first upper transistor connected between a first supply node and the first signal input node,
      a diode-connected first lower transistor connected between the first signal input node and a second supply node to selectively conduct a first rectifier current, and
      a first rectifier current mirror transistor connected to the first lower transistor to form a first rectifier current mirror circuit to generate a first rectifier mirror current signal proportional to the first rectifier current, and
   a second half bridge rectifier circuit, including:
      a second upper transistor connected between the first supply node and the second signal input node,
      a diode-connected second lower transistor connected between the second signal input node and the second supply node to selectively conduct a second rectifier current, and
      a second rectifier current mirror transistor connected to the second lower transistor to form a second rectifier current mirror circuit to generate a second rectifier mirror current signal proportional to the second rectifier current; and
   wherein the demodulator circuit is configured to generate the demodulator data signal based on the first and second rectifier mirror current signals and the limiter mirror current signal.

8. The transponder circuit of claim 7, wherein the first and second lower transistors are diode-connected NMOS transistors with drain and gate terminals connected to the second supply node.

9. The transponder circuit of claim 7, wherein the limiter circuit includes:
   a first limiter power transistor coupled between the first supply node and the first signal input node to selectively conduct a first limiter current, a first limiter current mirror transistor connected to the first limiter power transistor to form a first limiter current mirror circuit to generate a first limiter mirror current signal proportional to the first limiter current, a second limiter power transistor coupled between the first supply node and the second signal input node to selectively conduct a second limiter current, and a second limiter current mirror transistor connected to the second limiter power transistor to form a second limiter current mirror circuit to generate a second limiter mirror current signal proportional to the second limiter current;

wherein the demodulator circuit is configured to generate the demodulator data signal based on the first and second rectifier mirror current signals and the first and second limiter mirror current signals.

10. The transponder circuit of claim 1, wherein the limiter circuit includes:

a first limiter power transistor coupled between a first supply node and the first signal input node to selectively conduct a first limiter current, a first limiter current mirror transistor connected to the first limiter power transistor to form a first limiter current mirror circuit to generate a first limiter mirror current signal proportional to the first limiter current, a second limiter power transistor coupled between the first supply node and the second signal input node to selectively conduct a second limiter current, and a second limiter current mirror transistor connected to the second limiter power transistor to form a second limiter current mirror circuit to generate a second limiter mirror current signal proportional to the second limiter current;

wherein the demodulator circuit is configured to generate the demodulator data signal based on the rectifier mirror current signal and the first and second limiter mirror current signals.

11. The transponder circuit of claim 10, wherein the first and second limiter power transistors are PMOS transistors.

12. An integrated circuit (IC), comprising:

a signal input node pair to receive a radio frequency (RF) signal from an associated transponder antenna circuit, the signal input node pair including a first signal input node, and a second signal input node;

an externally accessible first terminal connected to the first signal input node;

an externally accessible second terminal connected to the second signal input node;

a rectifier circuit to generate a supply voltage from the RF signal received at the signal input node pair, the rectifier circuit including:

a rectifier power transistor connected to one of the first and second signal input nodes to selectively conduct a rectifier current to generate or maintain a supply voltage from the RF signal received at the signal input node pair, and a rectifier current mirror transistor connected to the rectifier power transistor to form a rectifier current mirror circuit to generate a rectifier mirror current signal proportional to the rectifier current;

a limiter circuit, including:

a limiter power transistor connected to one of the first and second signal input nodes to selectively conduct a limiter current corresponding to the RF signal to limit a voltage of the signal input node pair when the rectifier transistor is not conducting, and a limiter current mirror transistor connected to the limiter power transistor to form a limiter current mirror circuit to generate a limiter mirror current signal proportional to the limiter current; and a demodulator circuit to receive the rectifier mirror current signal and the limiter mirror current signal, the demodulator circuit configured to generate a binary demodulator data signal representing the presence or absence of a threshold amount of energy in the RF signal received at the signal input node pair based on the rectifier mirror current signal and the limiter mirror current signal.

13. The IC of claim 12, wherein the demodulator circuit includes:

a first comparator circuit to generate a first comparator output signal having a first state when the rectifier mirror current signal is greater than a first threshold current, and a second state when the rectifier mirror current signal is less than or equal to the first threshold current;

a second comparator circuit to generate a second comparator output signal having a first state when the limiter mirror current signal is greater than a second threshold current, and a second state when the limiter mirror current signal is less than or equal to the second threshold current; and a logic circuit to generate the demodulator data signal in a first state when either of the first and second comparator output signals is in the first state to indicate the presence of the threshold amount of energy in the RF signal, and to generate the demodulator data signal in a second state when the first and second comparator output signals are both in the second state to indicate the absence of the threshold amount of energy in the RF signal.

14. The IC of claim 13, further comprising:

a plurality of transponder channel circuits, individually including:

a signal input node pair to receive a radio frequency signal from an associated transponder antenna circuit, the individual signal input node pairs including a first signal input node, and a second signal input node, a rectifier circuit, including:

a rectifier power transistor connected to one of the first and second signal input nodes to selectively conduct a rectifier current to generate or maintain a supply voltage from the RF signal received at the signal input node pair, and a rectifier current mirror transistor connected to the rectifier electrical component to form a first current mirror circuit to generate a rectifier mirror current signal proportional to the rectifier current, and a limiter circuit, including:

a limiter power transistor connected to one of the first and second signal input nodes to selectively conduct a limiter current corresponding to the RF signal to limit a voltage of the signal input node pair when the rectifier transistor is not conducting, and a limiter current mirror transistor connected to the limiter transistor to form a second current mirror circuit to generate a limiter mirror current signal proportional to the limiter current; and wherein the demodulator circuit generates the demodulator data signal based on the rectifier mirror current signals and the limiter mirror current signals from the individual transponder channel circuits.

15. The IC of claim 14, further comprising:
a channel select circuit to generate a channel select signal indicating a particular one of the transponder channel circuits having a highest received field strength based on the rectifier mirror current signals and the limiter mirror current signals from the individual transponder channel circuits;
a modulation capacitor, including a first capacitor node, and a second capacitor node; and
a channel switching circuit to selectively connect the first and second capacitor nodes of the modulation capacitor to the particular one of the transponder channel circuits according to the channel select signal.

16. The IC of claim 12,
wherein the rectifier circuit is a full bridge rectifier, including:
a first half bridge rectifier circuit, including:
a first upper transistor connected between a first supply node and the first signal input node,
a diode-connected first lower transistor connected between the first signal input node and a second supply node to selectively conduct a first rectifier current, and
a first rectifier current mirror transistor connected to the first lower transistor to form a first rectifier current mirror circuit to generate a first rectifier mirror current signal proportional to the first rectifier current, and
a second half bridge rectifier circuit, including:
a second upper transistor connected between the first supply node and the second signal input node,
a diode-connected second lower transistor connected between the second signal input node and the second supply node to selectively conduct a second rectifier current, and
a second rectifier current mirror transistor connected to the second lower transistor to form a second rectifier current mirror circuit to generate a second rectifier mirror current signal proportional to the second rectifier current; and
wherein the demodulator circuit is configured to generate the demodulator data signal based on the first and second rectifier mirror current signals and the limiter mirror current signal.

17. The IC of claim 12,
wherein the limiter circuit includes:
a first limiter power transistor coupled between the first supply node and the first signal input node to selectively conduct a first limiter current,
a first limiter current mirror transistor connected to the first limiter power transistor to form a first limiter current mirror circuit to generate a first limiter mirror current signal proportional to the first limiter current,
a second limiter power transistor coupled between the first supply node and the second signal input node to selectively conduct a second limiter current, and
a second limiter current mirror transistor connected to the second limiter power transistor to form a second limiter current mirror circuit to generate a second limiter mirror current signal proportional to the second limiter current;
wherein the demodulator circuit is configured to generate the demodulator data signal based on the first and second rectifier mirror current signals and the first and second limiter mirror current signals.

18. A multichannel RFID transponder system, comprising:
a plurality of a transponder antenna circuits to receive a radio frequency (RF) signal, the individual transponder antenna circuits including an antenna with an inductance, and a capacitor, the individual antennas being positioned at different orientations from one another;
a plurality of transponder channel circuits, individually including:
a signal input node pair connected to a corresponding one of the transponder antenna circuits, the signal input node pair including a first signal input node, and a second signal input node,
a rectifier circuit to generate a supply voltage from the RF signal received at the signal input node pair, the rectifier circuit including:
a rectifier power transistor connected to one of the first and second signal input nodes to selectively conduct a rectifier current to generate or maintain a supply voltage from the RF signal received at the signal input node pair, and
a rectifier current mirror transistor connected to the rectifier power transistor to form a rectifier current mirror circuit to generate a rectifier mirror current signal proportional to the rectifier current, and
a limiter circuit, including:
a limiter power transistor connected to one of the first and second signal input nodes to selectively conduct a limiter current corresponding to the RF signal to limit a voltage of the signal input node pair when the rectifier transistor is not conducting, and
a limiter current mirror transistor connected to the limiter power transistor to form a limiter current mirror circuit to generate a limiter mirror current signal proportional to the limiter current; and
a demodulator circuit to generate a binary demodulator data signal representing the presence or absence of a threshold amount of energy in the RF signal received at the signal input node pairs based on the rectifier mirror current signals and the limiter mirror current signals from each of the transponder channel circuits.

19. The system of claim 18, wherein the demodulator circuit includes:
a first comparator circuit to generate a first comparator output signal having a first state when a sum of the rectifier mirror current signals from the transponder channel circuits is greater than a first threshold current, and a second state when the sum of the rectifier mirror current signals is less than or equal to the first threshold current;
a second comparator circuit to generate a second comparator output signal having a first state when a sum of the limiter mirror current signals from the transponder channel circuits is greater than a second threshold current, and a second state when the sum of the limiter mirror current signals is less than or equal to the second threshold current; and
a logic circuit to generate the demodulator data signal in a first state when either of the first and second comparator output signals is in the first state to indicate the presence of the threshold amount of energy in the RF signal, and to generate the demodulator data signal in a second state when the first and second comparator output signals are both in the second state to indicate the absence of the threshold amount of energy in the RF signal.

20. The system of claim 18, further comprising:
- a channel select circuit to generate a channel select signal indicating a particular one of the transponder channel circuits having a highest received field strength based on the rectifier mirror current signals and the limiter mirror current signals from the individual transponder channel circuits;
- a modulation capacitor, including a first capacitor node, and a second capacitor node; and
- a channel switching circuit to selectively connect the first and second capacitor nodes of the modulation capacitor to the particular one of the transponder channel circuits according to the channel select signal.

* * * * *